US011890869B2

(12) United States Patent
Kato et al.

(10) Patent No.: US 11,890,869 B2
(45) Date of Patent: Feb. 6, 2024

(54) PRINTING APPARATUS

(71) Applicant: BROTHER KOGYO KABUSHIKI KAISHA, Nagoya (JP)

(72) Inventors: Yushi Kato, Nagoya (JP); Sho Asai, Ama (JP); Shotaro Watanabe, Nagoya (JP); Yusuke Ikemoto, Nagoya (JP); Takehiko Inaba, Chita (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/562,927

(22) Filed: Dec. 27, 2021

(65) Prior Publication Data

US 2022/0203724 A1 Jun. 30, 2022

(30) Foreign Application Priority Data

Dec. 28, 2020 (JP) ................................ 2020-219185

(51) Int. Cl.
*B41J 15/04* (2006.01)
*B41J 29/13* (2006.01)
*B41J 3/407* (2006.01)

(52) U.S. Cl.
CPC ........... *B41J 15/042* (2013.01); *B41J 3/4075* (2013.01); *B41J 29/13* (2013.01)

(58) Field of Classification Search
None
See application file for complete search history.

(56) References Cited

U.S. PATENT DOCUMENTS

2014/0147186 A1* 5/2014 Uchino .................. B41J 3/4075 400/613
2015/0002604 A1* 1/2015 Aizawa .................... B41J 29/02 347/220
2016/0236488 A1 8/2016 Beck et al.
2016/0236492 A1 8/2016 Hutnak et al.
2017/0021609 A1 1/2017 Beck et al.

FOREIGN PATENT DOCUMENTS

CN 101909895 A * 12/2010 ............. B41J 11/04
JP 2001-302073 A 10/2001
JP 2016005961 A * 1/2016 ........... B32B 43/006

* cited by examiner

*Primary Examiner* — Matthew G Marini
(74) *Attorney, Agent, or Firm* — KENEALY VAIDYA LLP

(57) ABSTRACT

A printing apparatus includes: a main body having an accommodation part accommodating a printing medium; and an opening/closing cover supported by the main body so as to be swingable between a closed position and an opened position, a first unit and a second unit being selectively installable to the opening/closing cover, the first unit being configured to rotatably support a first platen roller, the second unit being configured to rotatably support a second platen roller, the opening/closing cover including a cover guide, the opening/closing cover having a discharge port discharging the guided printing medium. The first unit has a partition wall superposed to cover the cover guide and partitioning a space into the first platen roller-side and the discharge port-side in a case the first unit is installed to the opening/closing cover.

4 Claims, 30 Drawing Sheets

PRINTING APPARATUS

CROSS-REFERENCE TO RELATED APPLICATIONS

This application is based on and claims priority under 35 USC 119 from Japanese Patent Application No. 2020-219185 filed on Dec. 28, 2020, the contents of which are incorporated herein by reference.

TECHNICAL FIELD

The present disclosure relates to a printing apparatus, and specifically, to a printing apparatus configured to perform specific processing on a printing medium.

BACKGROUND

A related art discloses a printer having a body case configured to accommodate a roll sheet and a roll sheet cover configured to be openable and closable with respect to the body case. Here, a platen unit including a platen roller and a fixed blade is detachably fixed to a tip end portion of the roll sheet cover by a screw.

SUMMARY

One illustrative aspect of the present disclosure provides a printing apparatus including: a main body having an accommodation part configured to accommodate a printing medium; and an opening/closing cover supported by the main body so as to be swingable between a closed position and an opened position. The opening/closing cover covers the accommodation part in a case the opening/closing cover is in the closed position, and the opening/closing cover opens the accommodation part in a case the opening/closing cover is in the opened position. A first unit and a second unit are selectively installable to the opening/closing cover. The first unit is configured to rotatably support a first platen roller. The second unit is configured to rotatably support a second platen roller different from the first platen roller. The opening/closing cover includes a cover guide that is configured to guide the printing medium conveyed by the second platen roller in a case the second unit is installed to the opening/closing cover. The opening/closing cover has a discharge port, though which the printing medium guided by the cover guide is allowed to discharge toward one side in a first direction. The first unit is provided with a partition wall. The partition wall is superposed to cover the cover guide and partitions a space defined by the opening/closing cover and the cover guide into a first space and a second space in a case the first unit is installed to the opening/closing cover, the first platen roller being disposed in the first space, and the discharge port being disposed in the second space.

In the printing apparatus of the present disclosure, the first unit or the second unit is selectively installed to the opening/closing cover configured to open and close the accommodation part in which printing medium is accommodated. The printing medium guided from the accommodation part is subjected to predetermined processing by the first unit or the second unit, and is then discharged to an outside of the printing apparatus from the discharge port. The first unit has the first platen roller, and when performing processing by the first unit, the printing medium is conveyed by the first platen roller. The second unit has the second platen roller, and when performing processing by the second unit, the printing medium is conveyed by the second platen roller.

In a case where processing different from each other is performed by the first unit and the second unit, the suitable conveyance path at the time of discharging the printing medium from the discharge port after the processing may be different due to difference in processing content, difference in printing medium that is a processing target, and the like. In the present disclosure, the opening/closing cover is provided with the cover guide so as to configure the suitable conveyance path corresponding to each of such processing. The cover guide is configured to guide the printing medium that is conveyed by the second platen roller, in a case where the second unit is installed to the opening/closing cover. The cover guide can guide the printing medium through the conveyance path that is suitable for processing by the second unit, the type of the printing medium to be subjected to the processing, and the like.

In the present disclosure, the first unit is provided with the partition wall. The partition wall is provided superposed to cover the cover guide in a state where the first unit is installed to the opening/closing cover. The partition wall is configured to partition the first platen roller-side and the discharge port-side. In a case where the first unit is installed to the opening/closing cover, the printing medium that is conveyed by the first platen roller is conveyed through the conveyance path defined by the partition wall, not the cover guide. The partition wall can guide the printing medium through the conveyance path that is suitable for processing by the first unit, the type of the printing medium to be subjected to the processing, and the like.

Another illustrative aspect of the present disclosure provides a printing apparatus including: a main body having an accommodation part configured to accommodate a printing medium; and an opening/closing cover supported by the main body so as to be swingable between a closed position and an opened position, the opening/closing cover covering the accommodation part in a case the opening/closing cover is in the closed position, the opening/closing cover opening the accommodation part in a case the opening/closing cover is in the opened position, a first unit and a second unit being selectively installable to the opening/closing cover. The opening/closing cover may include a cover guide. The cover guide may be configured to be exposed in a case the first unit is uninstalled from the opening/closing cover. The printing apparatus may further include a conveyance path of the printing medium defined by the cover guide in a case the second unit is installed to the opening/closing cover.

Still another illustrative aspect of the present disclosure provides a printing apparatus including: a main body having an accommodation part configured to accommodate a printing medium; and an opening/closing cover supported by the main body so as to be swingable between a closed position and an opened position, the opening/closing cover covering the accommodation part in a case the opening/closing cover is in the closed position, the opening/closing cover opening the accommodation part in a case the opening/closing cover is in the opened position, a first unit and a second unit being selectively installable to the opening/closing cover. The first unit may be configured to rotatably support a first platen roller. The second unit may be configured to rotatably support a second platen roller different from the first platen roller. The opening/closing cover may include a cover guide that is configured to guide the printing medium conveyed by the second platen roller in a case the second unit is installed to the opening/closing cover. The opening/closing cover may have a discharge port, through which the printing medium guided by the cover guide being allowed to discharge. The first unit may be provided with a partition wall. The partition wall may be superposed to cover the cover guide and partition a recess defined by the opening/closing cover and the cover guide into a first space and a second space in a case the first unit is installed to the opening/closing cover. The first platen roller may be disposed in the first space, and the discharge port may be disposed in the second space.

According thereto, it is possible to set the conveyance path of the printing medium to the optimum conveyance path for each unit, in each of the case where the first unit is installed to the printing apparatus and the case where the second unit is installed to the printing apparatus.

BRIEF DESCRIPTION OF THE DRAWINGS

Illustrative embodiments of the present disclosure will be described in detail based on the following figures, wherein:

FIGS. 5A and 5B show the example where the double tear bar unit is installed to the printing apparatus, in which FIG. 5A is a longitudinal sectional view of a central part of the printing apparatus and FIG. 5B is a longitudinal sectional view of a part near a side of the printing apparatus;

FIGS. 6A and 6B show the example where the double tear bar unit is installed to the printing apparatus, in which FIG. 6A is an enlarged longitudinal sectional view of main parts of FIG. 5A and FIG. 6B is an enlarged longitudinal sectional view of main parts of FIG. 5B;

FIGS. 11A and 11B show the example where the linerless unit is installed to the printing apparatus, in which FIG. 11A is a longitudinal sectional view of a central part of the printing apparatus and FIG. 11B is a longitudinal sectional view of a part near a side of the printing apparatus;

FIGS. 12A and 12B show the example where the linerless unit is installed to the printing apparatus, in which FIG. 12A is an enlarged longitudinal sectional view of main parts of FIG. 11A and FIG. 12B is an enlarged longitudinal sectional view of main parts of FIG. 11B;

FIGS. 17A and 17B show the example where the peeler unit is installed to the printing apparatus, in which FIG. 17A is a longitudinal sectional view of a central part of the printing apparatus and FIG. 17B is a longitudinal sectional view of a part near a side of the printing apparatus;

FIGS. 18A and 18B show the example where the peeler unit is installed to the printing apparatus, in which FIG. 18A is an enlarged longitudinal sectional view of main parts of FIG. 18A and FIG. 18B is an enlarged longitudinal sectional view of main parts of FIG. 18B;

FIGS. 21A and 21B show the peeler unit, in which FIG. 21A is a longitudinal sectional view of a central part of the peeler unit and FIG. 21B is a longitudinal sectional view of a part near a side of the peeler unit;

FIGS. 24A and 21B show the upper unit that configures a part of the peeler unit, in which FIG. 24A is a longitudinal sectional view of a central part of the upper unit and FIG. 24B is a longitudinal sectional view of a part near a side of the upper unit;

FIGS. 29A and 29B show the lower unit that configures a part of the peeler unit, in which FIG. 29A is a longitudinal sectional view of a central part of the lower unit and FIG. 29B is a longitudinal sectional view of a part near a side of the lower unit.

DETAILED DESCRIPTION

The above-described related-art configuration is merely for improving an assembling operability of components and does not consider a situation where a plurality of different platen units corresponding to user's desired uses is prepared and is replaced and used as appropriate.

Therefore, one illustrative aspect of the present disclosure provides a printing apparatus that provides a first unit and a second unit, which are different and prepared according to user's desired uses, and setting a conveyance path of a printing medium to an optimum conveyance path for each unit in each of a case where the first unit is installed and a case where the second unit is installed.

Hereinafter, a printing apparatus according to an illustrative embodiment of the present disclosure will be described with reference to the drawings. Note that, in descriptions below, as shown in FIG. 1, each direction of the front, rear, left, right, upper and lower is defined in a state where a printing apparatus is placed on a desk.

Double Tear Bar Unit

Figure 1:
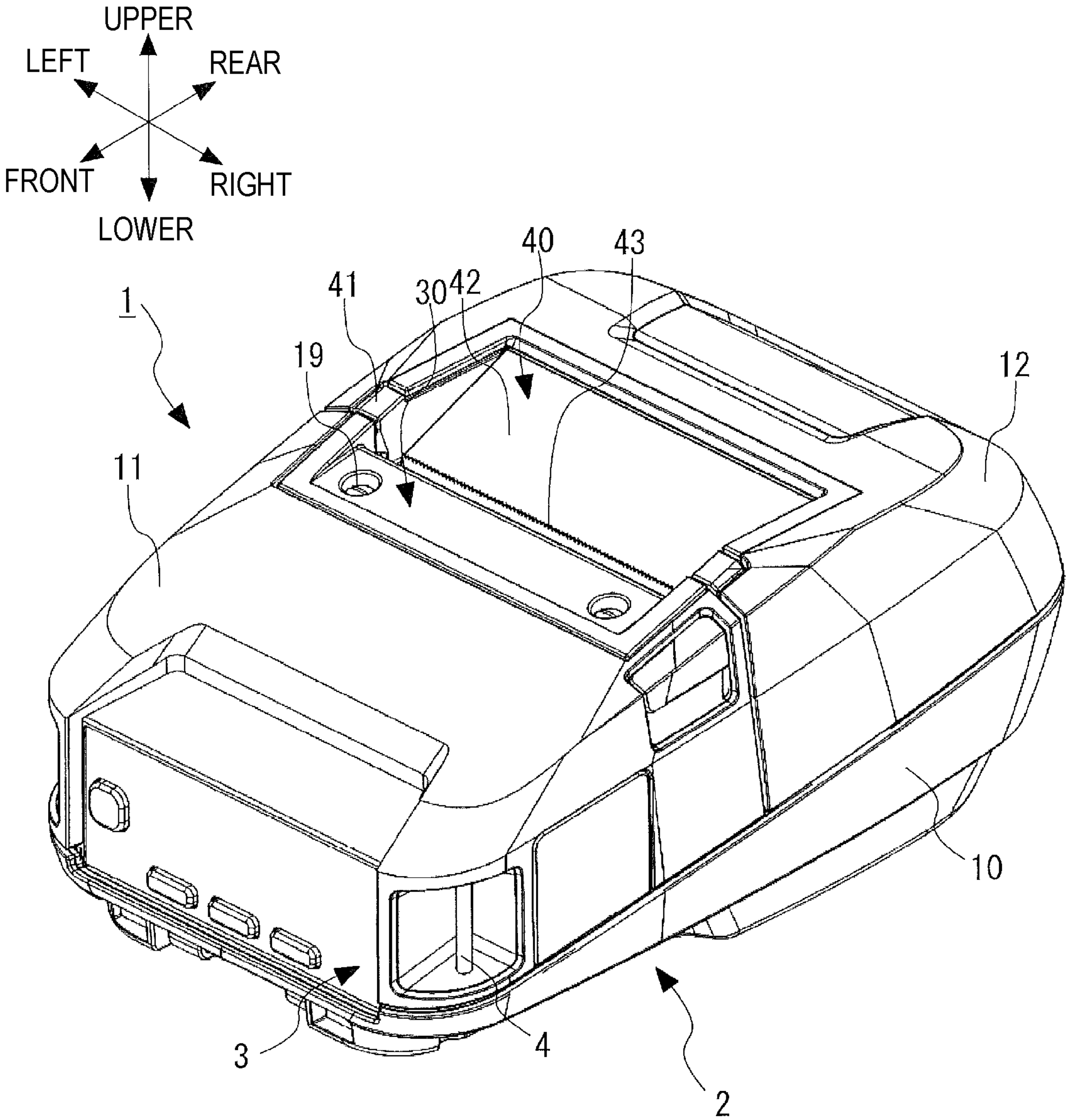
FIG. 1 is an appearance perspective view of a printing apparatus, showing an example where a double tear bar unit is installed to the printing apparatus.

FIGS. 1 to 8 show a case where a double tear bar unit 40 as a unit configured to perform specific processing on a printing medium is installed to a printing apparatus 1. In FIG. 1, the printing apparatus 1 includes a lower case 10 as the main body, an upper front-side cover 11, and an upper rear-side cover 12 as the opening/closing cover, which configure a substantially rectangular three-dimensional housing 2.

The lower case 10 is provided on a front surface with an operation panel unit 3 on which a variety of operation switches are disposed, and hook portions 4 to which both ends of a shoulder belt (not shown) are engaged are provided at left and right corner portions ranging from the front surface to side surfaces. The printing apparatus 1 is carried and used by a user by being put on a shoulder by the shoulder belt. In such use aspect, the front (forward) becomes the upper (upward).

Note that, although not shown, the lower case 10 is provided with various connection units such as a USB (abbreviation of Universal Serial Bus) port, an RS-232C (abbreviation of Recommended Standard 232) connector and the like, for example, as a communication means, and can connect to a supply of electric power, a print data input terminal (for example, a personal computer, a bar-code reader and the like), and the like. In addition to the communication means, the lower case 10 has a variety of functions of wired LAN (abbreviation of Local Area Network), wireless LAN and Bluetooth (registered trademark), and a label including variable data (text, bar-code) can be issued simply by transmitting text data to the printing apparatus 1 by using the various communication means.

In addition, the labels to be issued may include labels used in various fields such as an actual product label and a tag label for manufacturing/logistics, a food label and a price tag label for retail and a sample label and a medicine notebook label for medical use.

As shown in FIGS. 2 to 6B, the printing apparatus 1 is provided therein with electronic components relating to drive and control such as a charging-type battery 5 and a circuit board 6, a detector 7, a chevron-like front-side tear bar 14, a discharge port 15 and a print head 16. The electronic components are located below the upper front-side cover 11. The detector 7 includes an optical sensor configured to presence or absence of a label. The chevron-like front-side tear bar 14 continues in the right and left direction. The discharge port 15 is disposed between a rear end portion of the upper front-side cover 11 and a tip end portion of the upper rear-side cover 12. The print head 16 is disposed in a position that faces a platen roller 17, which will be described later. The front-side tear bar 14 is a cutting blade for manually cutting the printing medium after printing by a user.

The upper front-side cover 11 is provided with a front-side installation part 20 to which a lid member 30 is removably installed via a pair of left and right screws 19. The screw 19 has a male thread portion that passes through the lid member 30 and is screwed into an attachment hole 20*a* (refer to FIG. 6B) having a bottomed female thread hole shape that opens to an upper surface of the front-side installation part 20 and does not penetrate.

Here, if the attachment hole 20*a* of the front-side installation part 20 is a through-hole, liquids such as water droplets and rainwater or dust may enter an inside of the front-side installation part 20 through the through-hole, depending on use environments of the printing apparatus 1. In this case, the printing apparatus 1 may not normally operate. However, the attachment hole 20*a* is formed to have a bottomed female thread hole shape that does not penetrate, so that it is possible to prevent liquids or dust from entering.

Below the upper rear-side cover 12, an accommodation part 22 configured to replaceably accommodate a roll 21 on which the printing medium is wound is provided. The upper rear-side cover 12 is configured to function as an opening/closing cover supported to a support part 10*a*, which is provided near a rear end of the lower case 10 and is a rotation fulcrum, so as to be swingable between a closed position in which the upper rear-side cover covers the accommodation part 22 and an opened position in which the upper rear-side cover opens the accommodation part 22. Thereby, the upper rear-side cover 12 can be opened and closed when replacing the roll 21 and when replacing a unit configured to perform specific processing, which will be described later.

In addition, the rear end portion of the upper front-side cover 11 and the tip end portion of the upper rear-side cover 12 are spaced, and the spaced portion is provided with the discharge port 15. The printing medium pulled out from the roll 21 and printed is discharged from the discharge port 15.

Figure 5A:
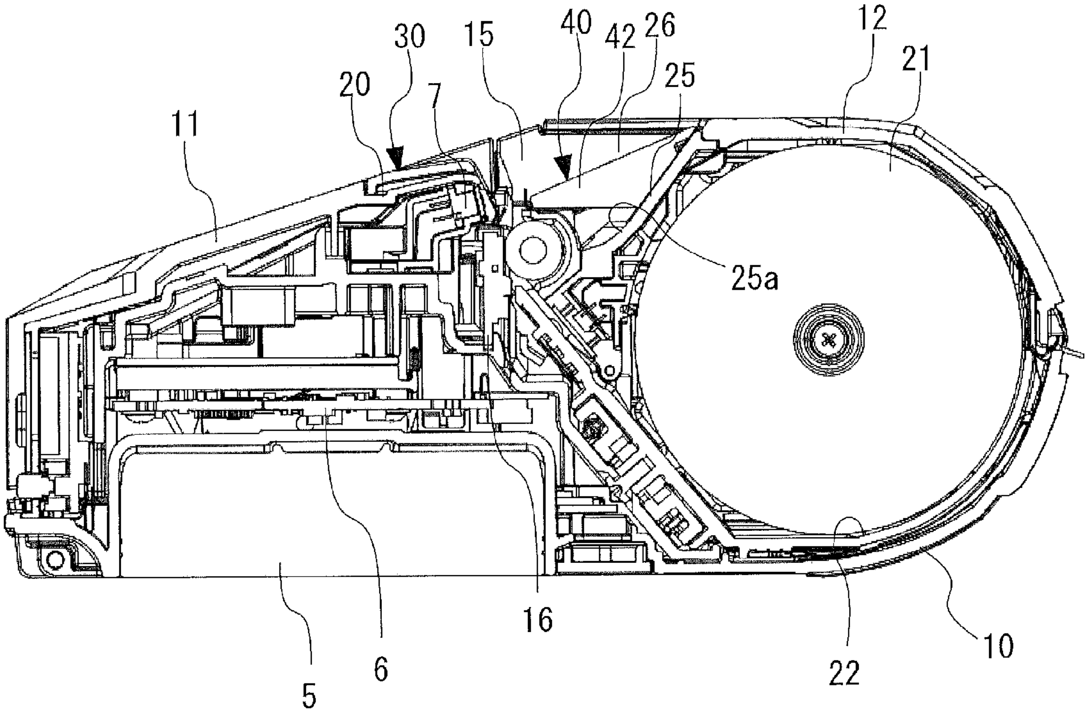
Figure 5B:
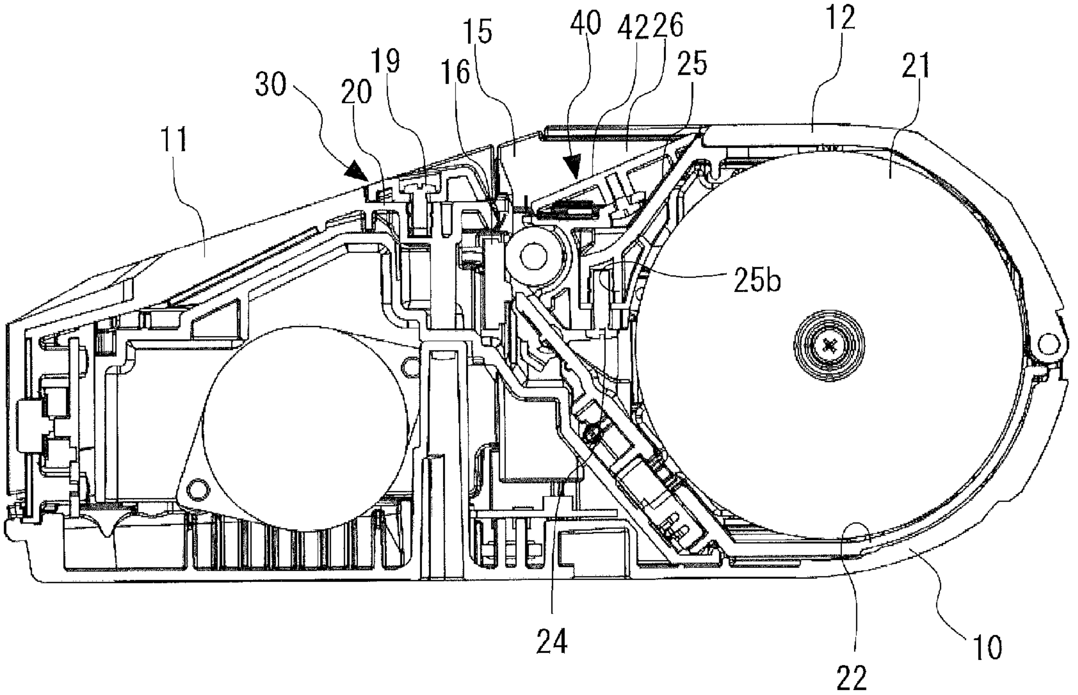
Figure 6A:
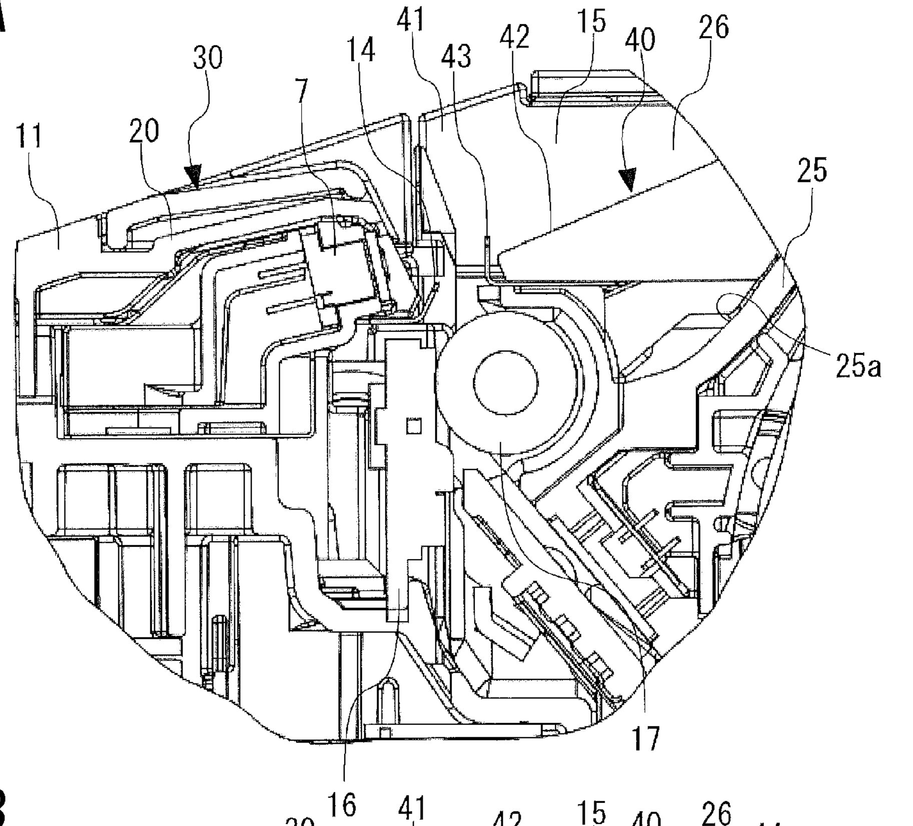
Figure 6B:
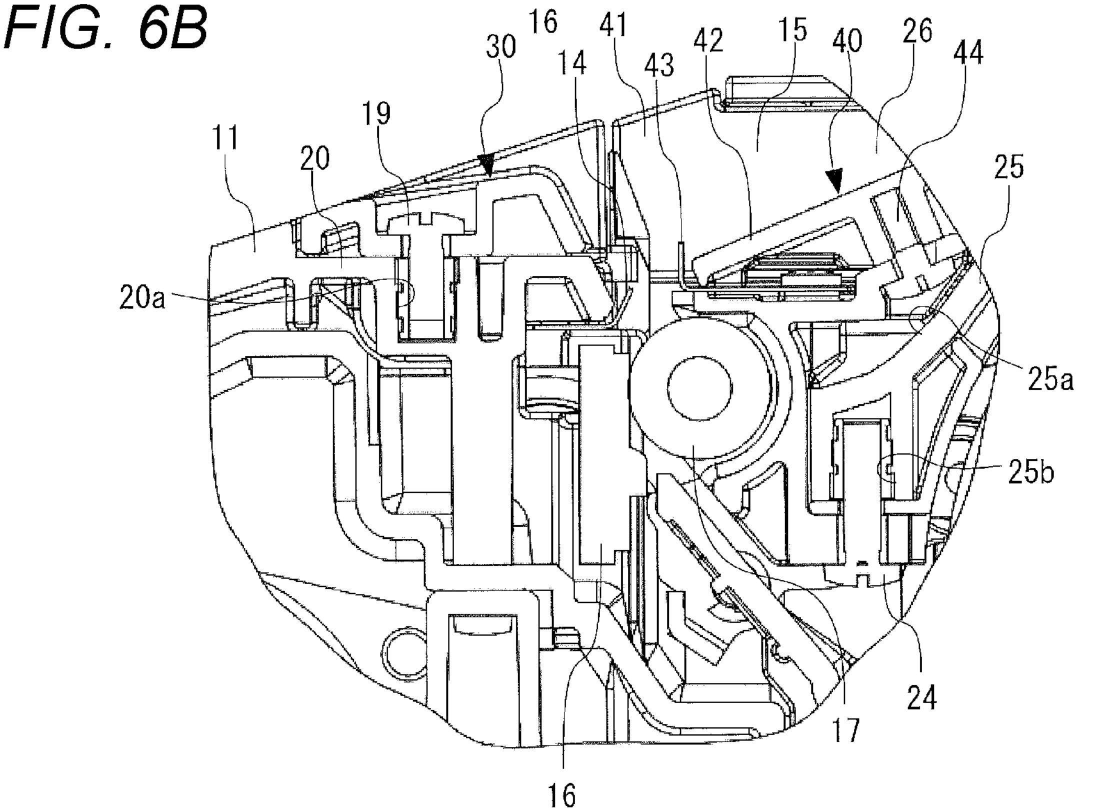

Note that, the upper rear-side cover 12 is provided with a rear-side installation part 25 to which the double tear bar unit 40 is removably installed via a pair of left and right screws 24 (only one is shown in FIGS. 5B and 6B).

The rear-side installation part 25 configures a part of the upper rear-side cover 12. The rear-side installation part 25 has a cover guide 25*a* inclined in a front-low and rear-high shape so as to form a unit installation space 26 at the upper. The rear-side installation part 25 has an attachment hole 25*b* having an inverted bottomed female thread hole shape that opens to a lower surface of the rear-side installation part 25 and does not penetrate.

The lid member 30 has a function as a so-called dummy cover, in the present illustrative embodiment. The lid member 30 is attached to the front-side installation part 20 so that the front-side installation part 20 is not exposed so as not to spoil an appearance, in a case where a unit configured to perform specific processing, such as a peeler unit 60, is not installed.

Figure 7:
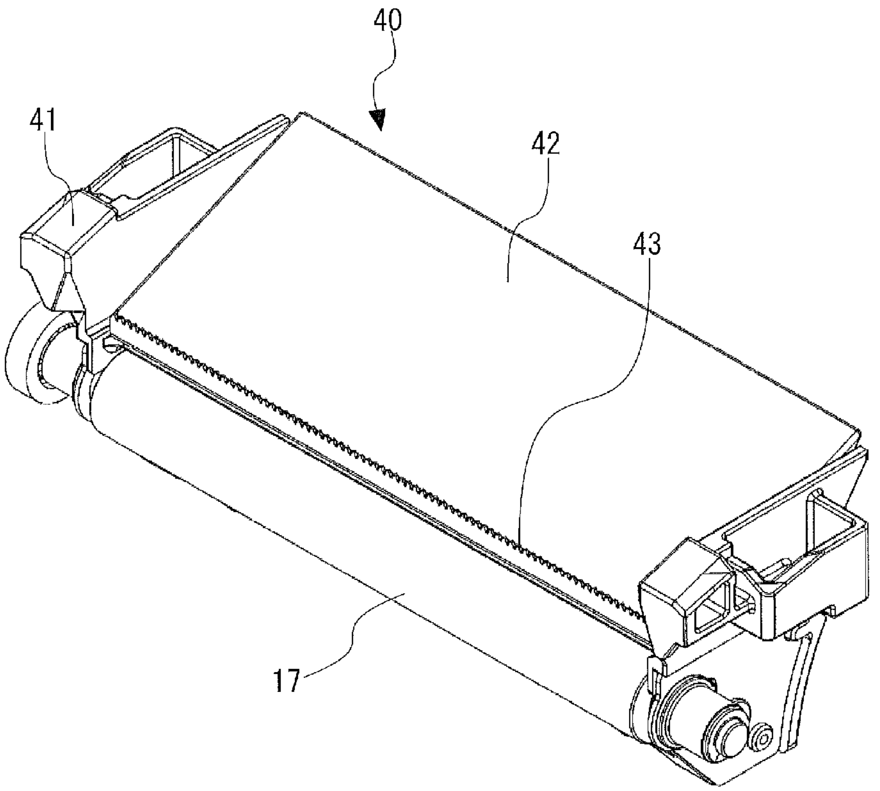
FIG. 7 is a perspective view of the double tear bar unit that is installed to the printing apparatus.

As shown in FIG. 7, the double tear bar unit 40 has a housing 41, a platen roller 17, a partition wall 42 and a chevron-like rear-side tear bar 43. The platen roller 17 is pivotally supported between both ends of the housing 41. The partition wall 42 is located on an upper surface-side of the housing 41 and is inclined in a front-low and rear-high shape. The chevron-like rear-side tear bar 43 is disposed ahead of the partition wall 42 and continues in the right and left direction. The partition wall 42 is fixed to the housing 41 via a screw 44. The rear-side tear bar 43 is a cutting blade for manually cutting the printing medium after printing by the user.

The screw 24 has a male thread portion that penetrates the housing 41 and is screwed into the attachment hole 25*b* of the rear-side installation part 25.

Here, the attachment hole 25*b* of the rear-side installation part 25 is formed to have an inverted bottomed female thread hole shape that does not penetrate, so that liquids or dust can be prevented from entering from an outside.

In this way, the front-side installation part 20 and the rear-side installation part 25 configure a installation part configured to enable replacement of various units configured to perform specific processing, which will be described later, in addition to the lid member 30 and the double tear bar unit 40, according to use aspects thereof (aspects to issue labels).

In addition, the front-side installation part 20 and the rear-side installation part 25 respectively have the attachment holes 20*a* and the attachment holes 25*b*. The front-side installation part 20 and the rear-side installation part 25 configure an installation part configured to selectively attach the double tear bar unit 40 and the lid member 30 via the screws 19 and the screws 24 that are screwed into the attachment holes 20*a* and the attachment holes 25*b*, respectively.

Therefore, any one of the double tear bar unit 40 and the lid member 30 is selectively attached to the front-side installation part 20 or the rear-side installation part 25 as an installation part. The attaching is performed by the screws 19 and the screws 24 that are screwed into the attachment holes 20*a* and the attachment holes 25*b*, respectively. Thereby, the user can easily attach and detach the double tear bar unit 40 and the lid member 30 by a simple screwing operation.

Figure 8:
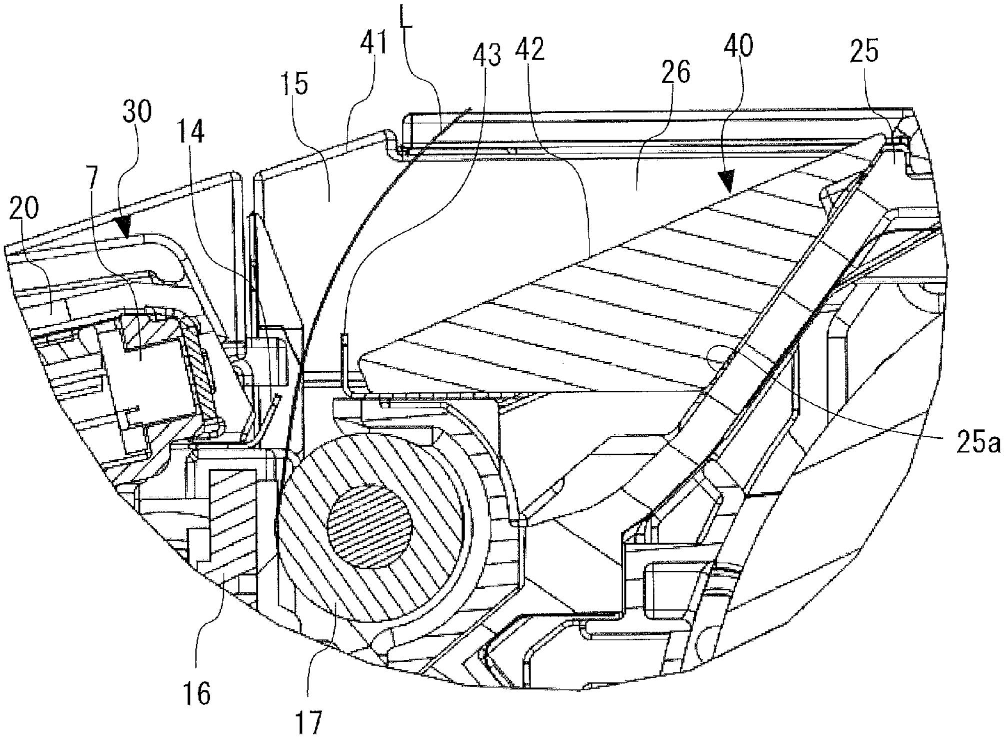
FIG. 8 is a sectional view illustrating operations of main parts, showing the example where the double tear bar unit is installed to the printing apparatus.
Figure 9:
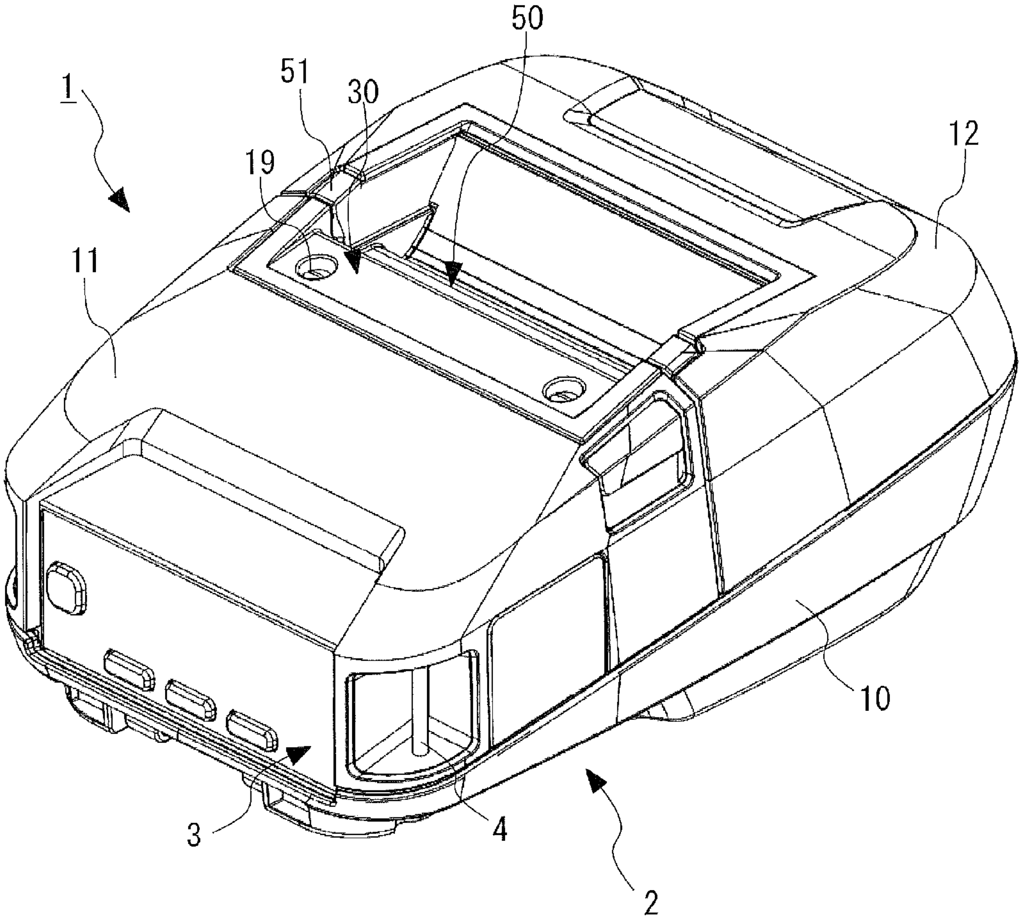
FIG. 9 is an appearance perspective view of the printing apparatus, showing an example where a linerless unit is installed to the printing apparatus.
Figure 10:
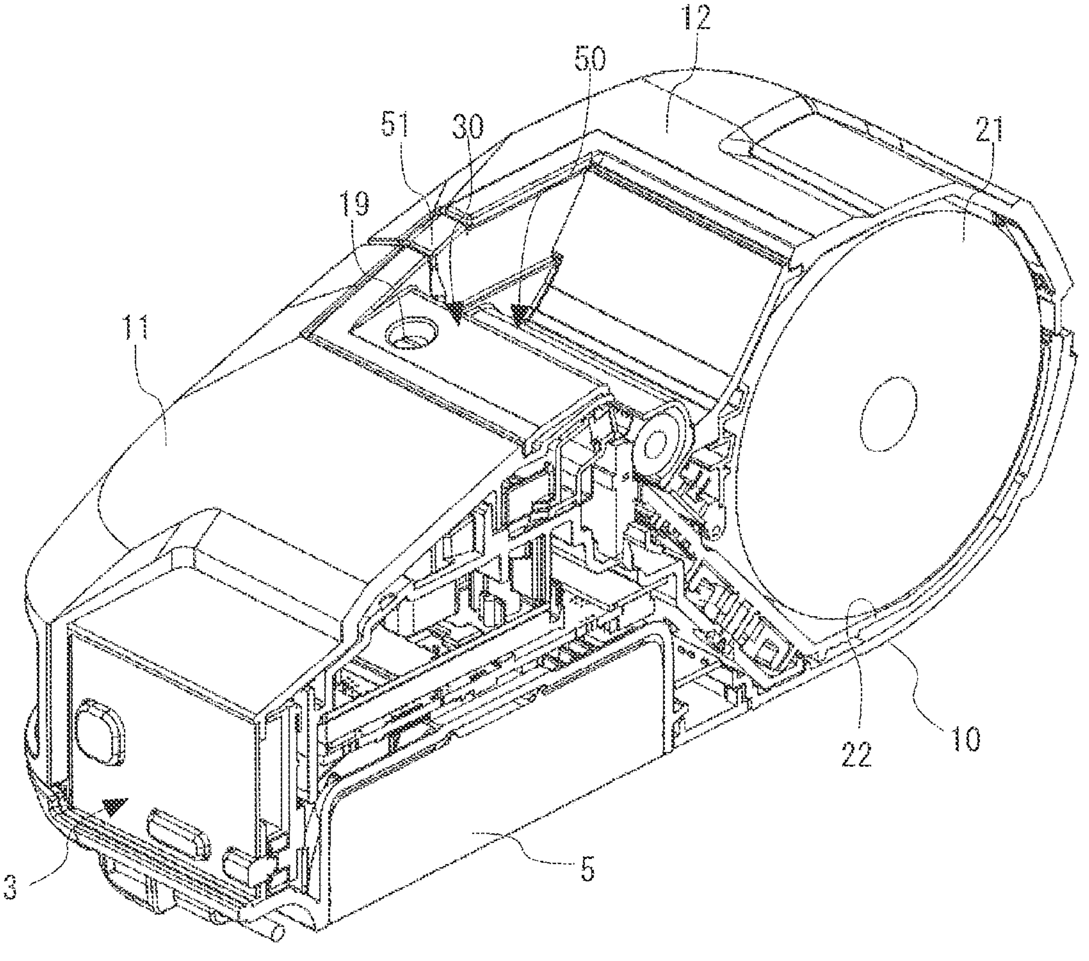
FIG. 10 is a central sectional perspective view of the printing apparatus, showing the example where the linerless unit is installed to the printing apparatus.

At this time, as shown in FIG. 8, the lid member 30 and the double tear bar unit 40 are formed to surround a part of the discharge port 15 through which a label L as the printing medium pulled out from the roll 21 and printed is discharged.

The detector 7 is provided to the front-side installation part 20. The detector 7 is configured to detect the printing medium, which is discharged from the discharge port 15 via the double tear bar unit 40 installed to the rear-side installation part 25, specifically, in the present illustrative embodiment, the label L pulled out from the roll 21 and printed.

Here, in a case of a configuration where the detector 7 is not provided to the front-side installation part 20 but is provided to a unit removably installed to the front-side installation part 20, the harness for connecting the detector 7 and the circuit board 6 each other is also necessarily attached and detached each time the unit is attached and detached with respect to the front-side installation part 20, which is troublesome. In the present illustrative embodiment, since the detector 7 is provided to the front-side installation part 20, it is not necessary to attach and detach the harness with respect to the detector 7 each time the unit is attached and detached with respect to the front-side installation part 20. Therefore, it is possible to avoid troublesomeness.

Figure 2:
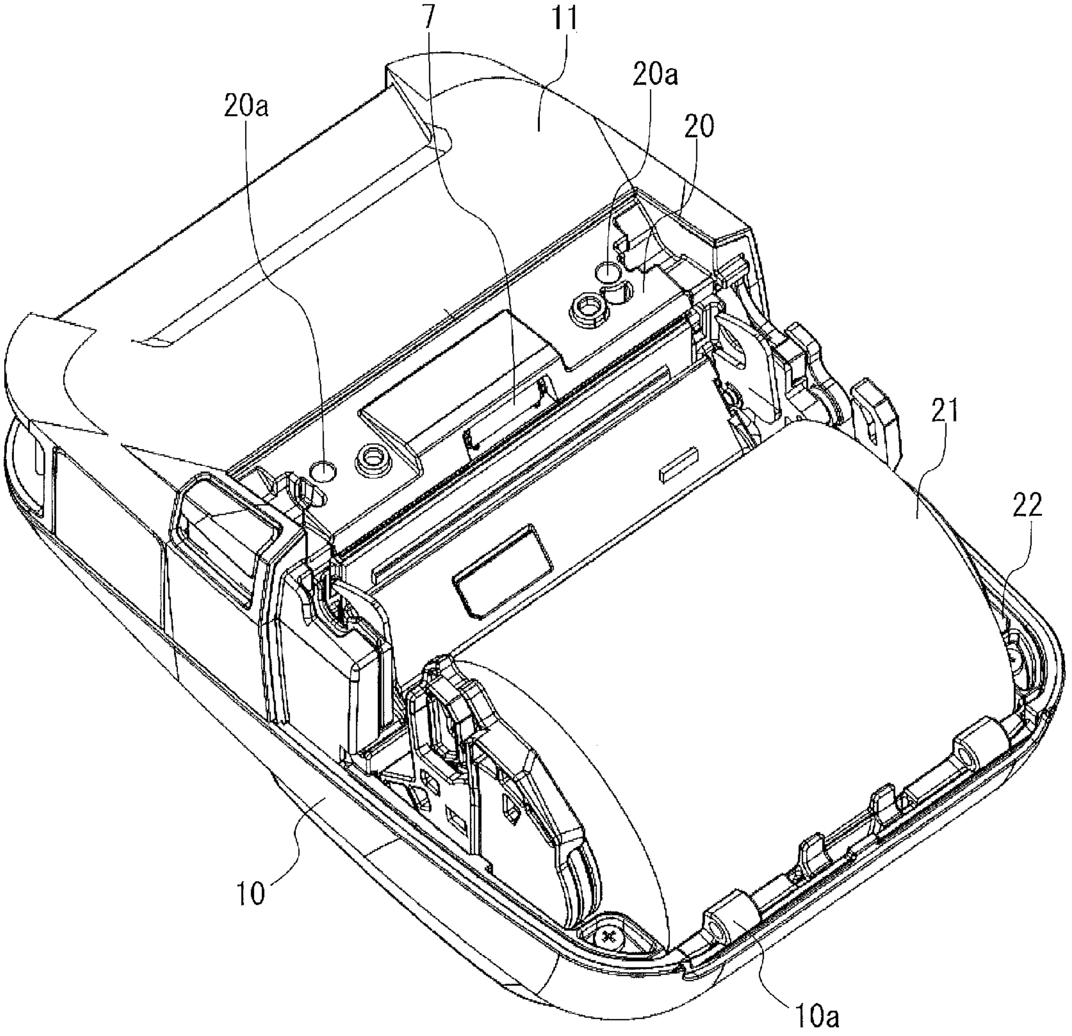
FIG. 2 is a perspective view of the printing apparatus in a state where an upper rear-side cover and a lid member are detached, showing the example where the double tear bar unit is installed to the printing apparatus.
Figure 3:
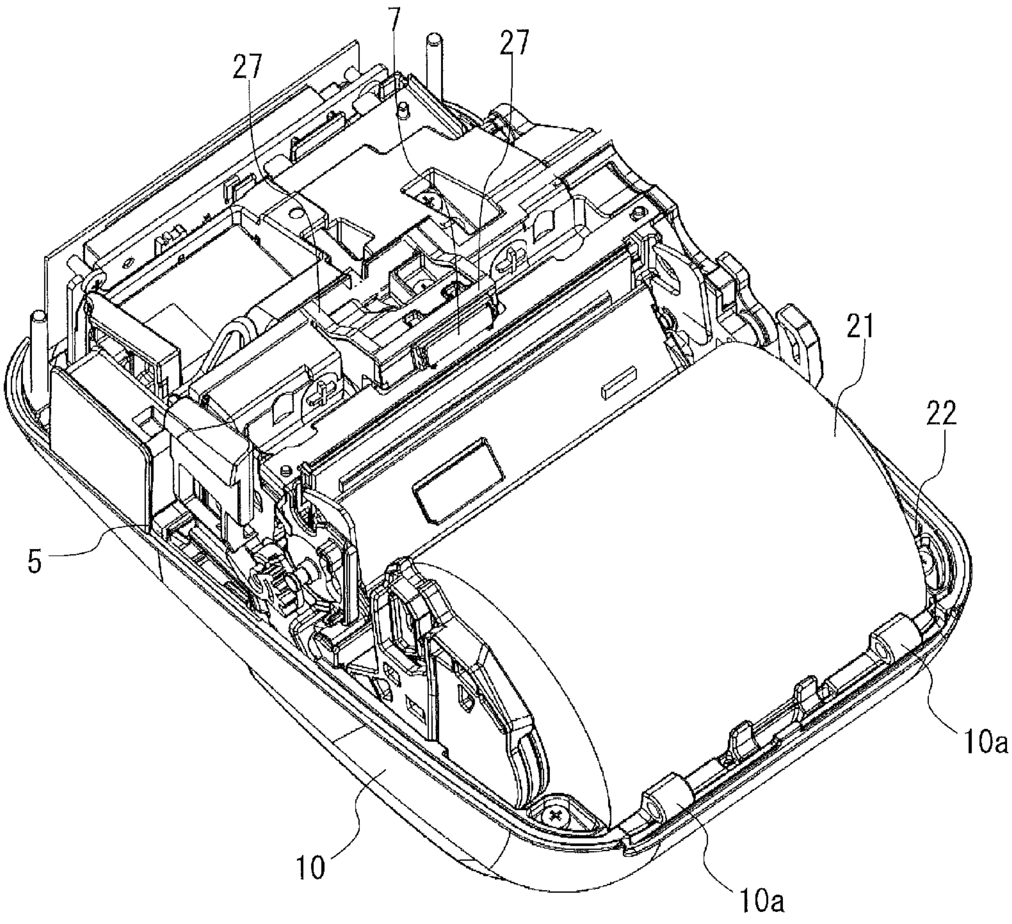
FIG. 3 is a perspective view of the printing apparatus in a state where an upper front-side cover and the upper rear-side cover are detached, showing the example where the double tear bar unit is installed to the printing apparatus.
Figure 4:
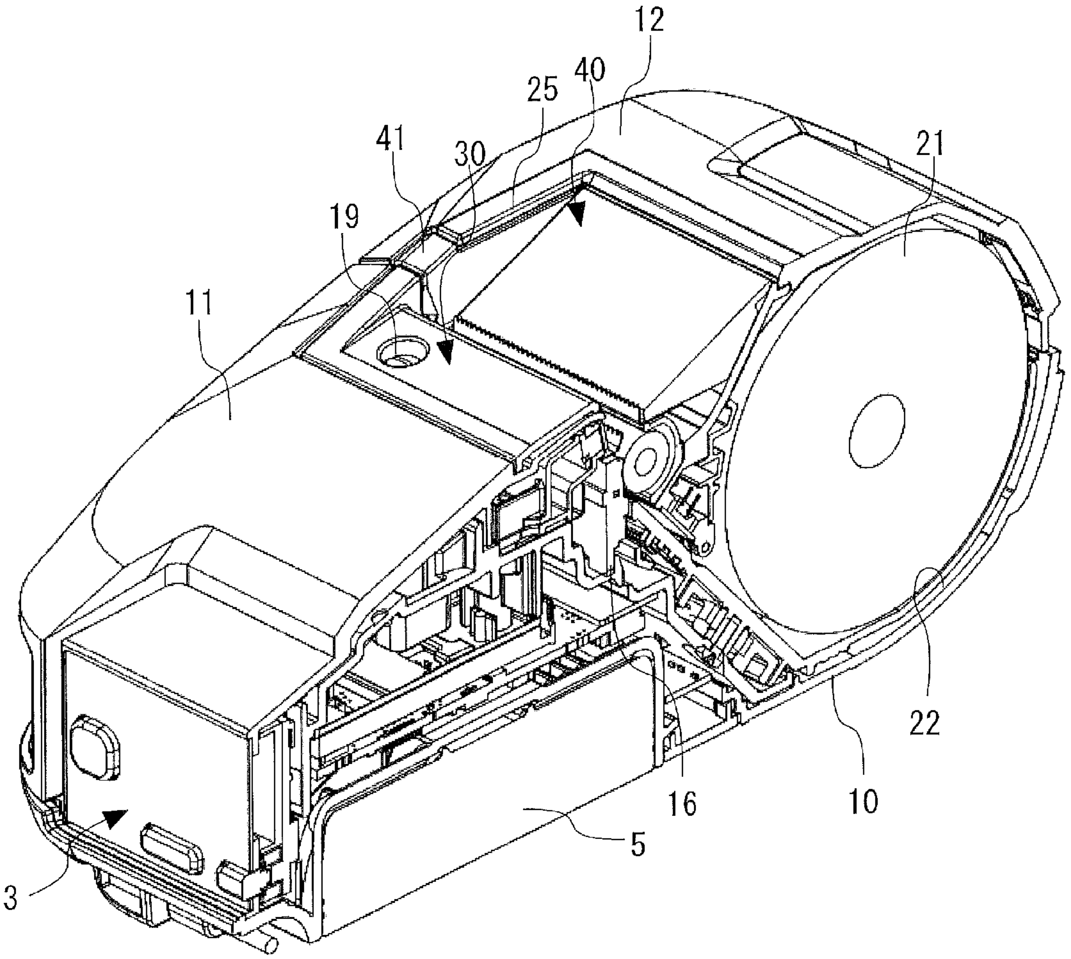
FIG. 4 is a central sectional perspective view of the printing apparatus, showing the example where the double tear bar unit is installed to the printing apparatus.

Note that, as shown in FIG. 2, the detector 7 is covered by the upper front-side cover 11 as a cover member. FIG. 3 shows a state where the upper front-side cover 11 is detached. An inside of the detector 7 is sealed by a drip-proof seal member 27 that is an elastic member provided at a portion of the front-side installation part 20 on a more inner side than the upper front-side cover 11. When the upper front-side cover 11 is attached to the lower case 10, the drip-proof seal member 27 is closely contacted to a backside of the upper front-side cover 11 to prevent liquids or dust from entering from an outside.

Here, after preparing the label L by using desired print data, the user can pick up a tip end of the label L discharged from the discharge port 15 and cut the same by using any one of the front-side tear bar 14 or the rear-side tear bar 43.

Thereby, the user can cut the printed label L from the roll 21, for example, when the label L is a receipt or when the label L is a seal-shaped label with a mount that is not continuous, like a label for a medicine notebook.

As described above, the printing apparatus 1 includes the housing 2 having the discharge port 15 through which the label L is discharged, the front-side installation part 20 and the rear-side installation part 25 to which a unit provided to surround at least a part of the discharge port 15 and configured to specific processing on the label L is removably installed, and the lid member 30 that is removably installed to the front-side installation part 20 when the unit is not installed to the front-side installation part 20.

Thereby, the specific processing, i.e., cutting operation toward the rear side of the printing apparatus 1 can be performed on the label L by the double tear bar unit 40 installed to the rear-side installation part 25. In addition, in a case where the lid member 30 is installed to the front-side installation part 20, the lid member 30 covers the front-side installation part 20 to configure a part of the appearance of the printing apparatus 1, so that the good-looking appearance of the printing apparatus 1 can be maintained.

Further, since the inside of the detector 7 is sealed by the drip-proof seal member 27, it is possible to prevent liquids or dust from entering from an outside.

Linerless Unit

FIGS. 9 to 14 show a case where a linerless unit 50 as a unit configured to perform specific processing on a printing medium is installed. Note that, in descriptions below, the same configurations as the above illustrative embodiment are denoted with the same reference signs, and the detailed descriptions thereof are omitted.

As shown in FIGS. 9 to 12B, the printing apparatus 1 configures the housing 2 by the lower case 10, the upper front-side cover 11 and the upper rear-side cover 12, has the operation panel unit 3 and the hook portions 4 provided on the surface, and is provided therein with the battery 5, the circuit board 6, the detector 7, the front-side tear bar 14, the print head 16, and the platen roller 17.

The lid member 30 is removably installed to the front-side installation part 20 of the upper front-side cover 11 via the pair of left and right screws 19.

Below the upper rear-side cover 12, the accommodation part 22 configured to replaceably accommodate the roll 21 on which a tape-shaped label L having an adhesive layer on one side and without a mount (release paper) is wound as the printing medium is provided.

The rear end portion of the upper front-side cover 11 and the tip end portion of the upper rear-side cover 12 are spaced, and the spaced portion is provided with the discharge port 15 through which the label L after printing is discharged.

Figure 11A:
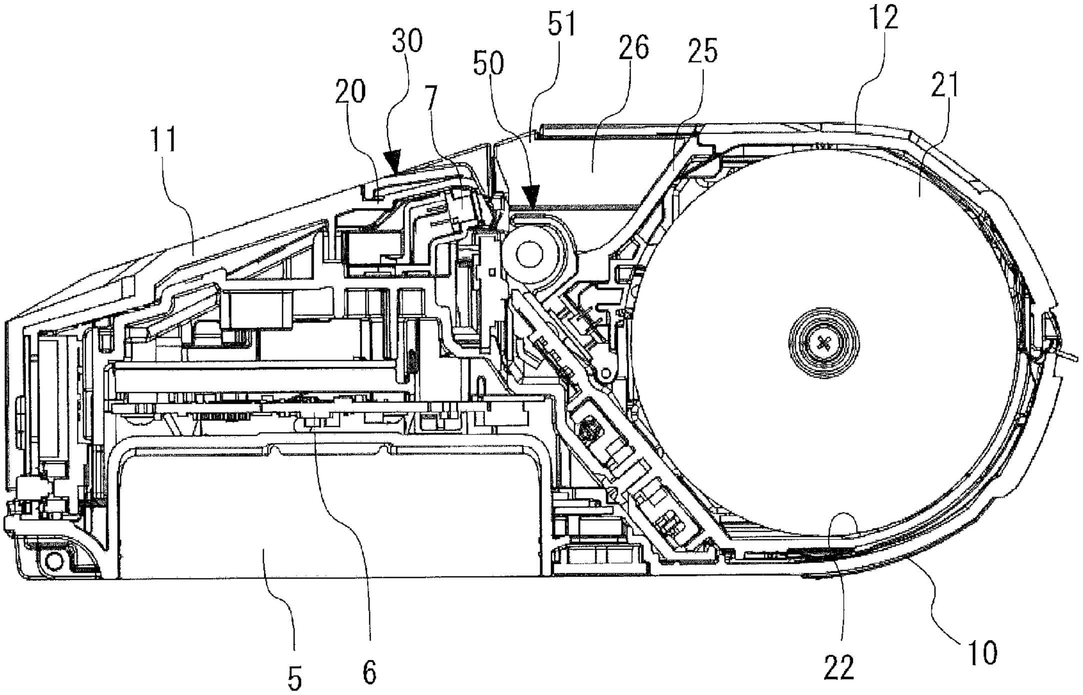
Figure 11B:
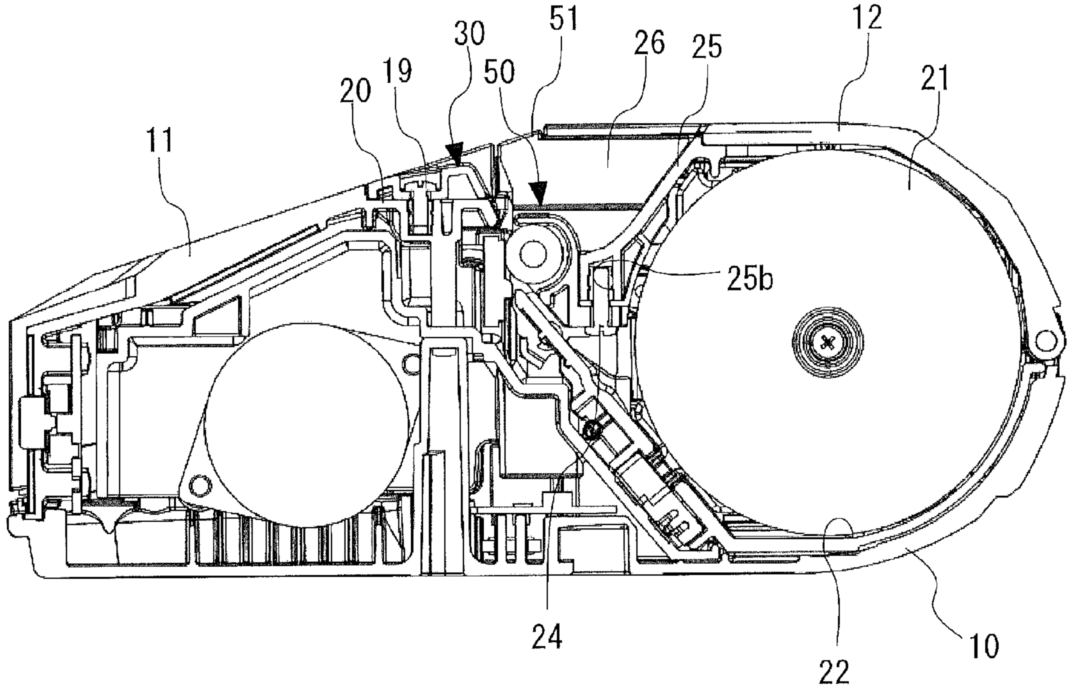
Figure 12A:
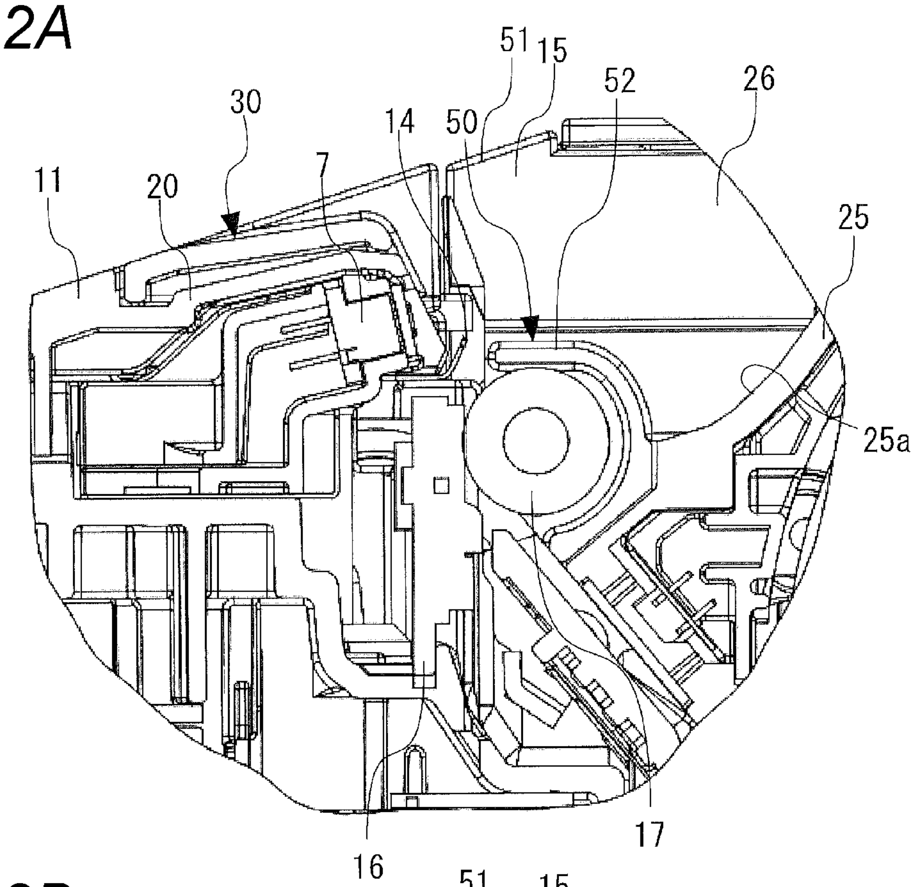
Figure 12B:
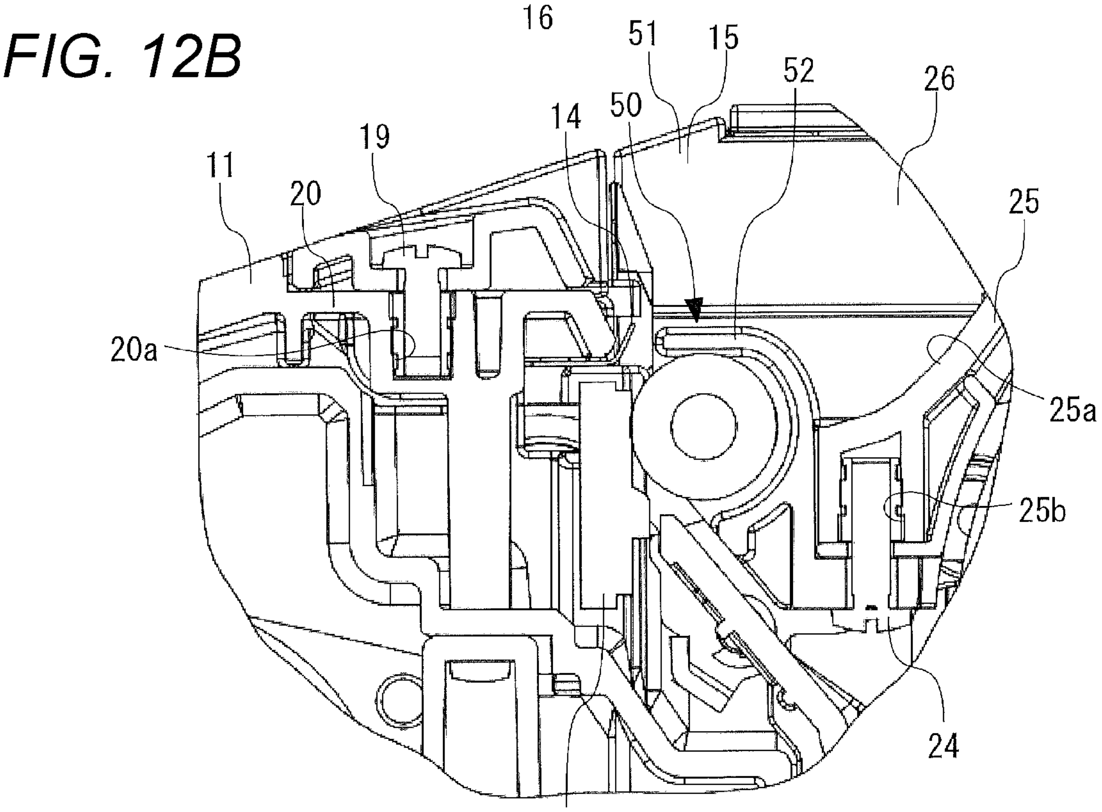

The upper rear-side cover 12 is provided with the rear-side installation part 25. A linerless unit 50 is removably installed to the rear-side installation part 25 via the pair of left and right screws 24 (only one is shown in FIGS. 11B and 12B).

The lid member 30 has a function as a so-called dummy cover, in the present illustrative embodiment. The lid member 30 is attached to the front-side installation part 20 so that the front-side installation part 20 is not exposed so as not to spoil an appearance, in a case where a unit (which will be described later) configured to perform specific processing, such as a peeler unit 60, is not installed.

Figure 13:
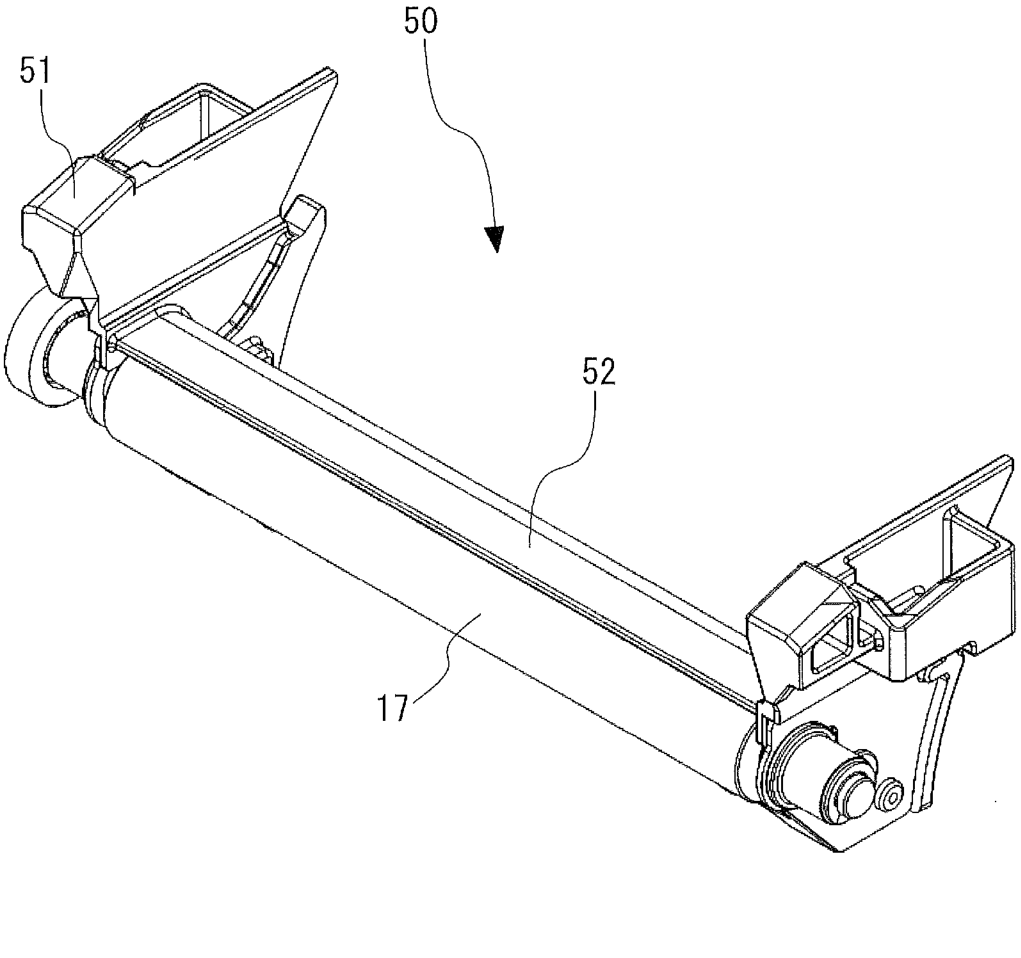
FIG. 13 is a perspective view of the linerless unit that is installed to the printing apparatus.

As shown in FIG. 13, the linerless unit 50 has a housing 51, and a platen roller 17 pivotally supported between both ends of the housing 51. In addition, the housing 51 is integrally provided with an awning-shaped restraint edge part 52 extending so as to cover the upper of the platen roller 17. For the platen roller 17 of the linerless unit 50, a material that suppresses sticking of the adhesive layer of the printing medium is used. In addition, a surface of the restraint edge part 52 has been subjected to a surface treatment of suppressing sticking of the adhesive layer of the printing medium.

The screw 24 has a male thread portion that penetrates the housing 51 and is screwed into the attachment hole 25*b* having an inverted bottomed female thread hole shape that opens to a lower surface of the rear-side installation part 25 and does not penetrate.

In this way, the front-side installation part 20 and the rear-side installation part 25 configure a installation part configured to enable replacement of another unit configured to perform specific processing, which will be described further later, in addition to the lid member 30 and the double tear bar unit 40 or the linerless unit 50 described in the present illustrative embodiment, according to use aspects thereof (aspects to issue labels).

In addition, the front-side installation part 20 and the rear-side installation part 25 each have the attachment holes 20*a* and the attachment holes 25*b* and configure a installation part configured to selectively attach the linerless unit 50 and the lid member 30 via the screws 19 and the screws 24 that are screwed into the attachment holes 20*a* and the attachment holes 25*b*.

Therefore, any one of the linerless unit 50 and the lid member 30 is selectively attached to the front-side installation part 20 or the rear-side installation part 25 as a installation part. The attaching is performed by the screws 19 and the screws 24 that are screwed into the attachment holes 20*a* and the attachment holes 25*b*, respectively.

Thereby, the user can easily attach and detach the linerless unit 50 and the lid member 30 by a simple screwing operation. In addition, any one of the linerless unit 50 and the double tear bar unit 40 is selectively attached to the rear-side installation part 25 as a installation part.

Figure 14:
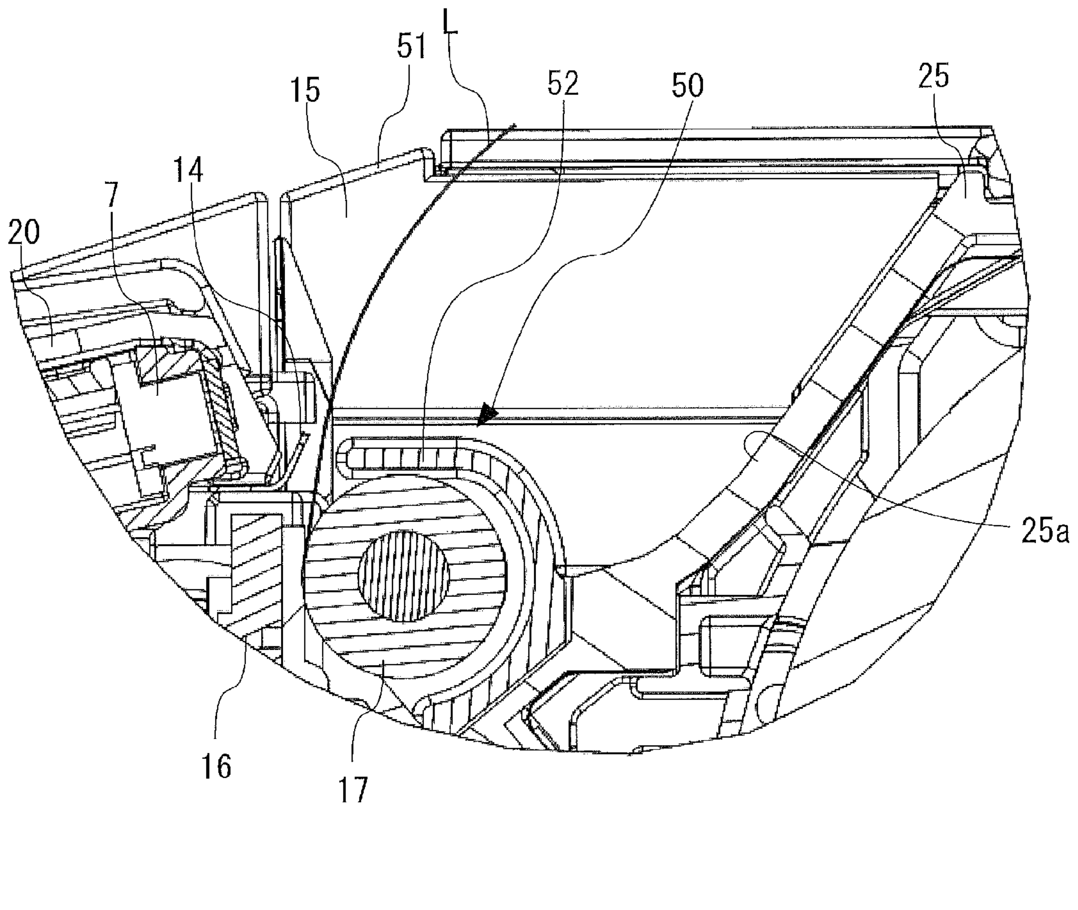
FIG. 14 is a sectional view illustrating operations of main parts, showing the example where the linerless unit is installed to the printing apparatus.
Figure 15:
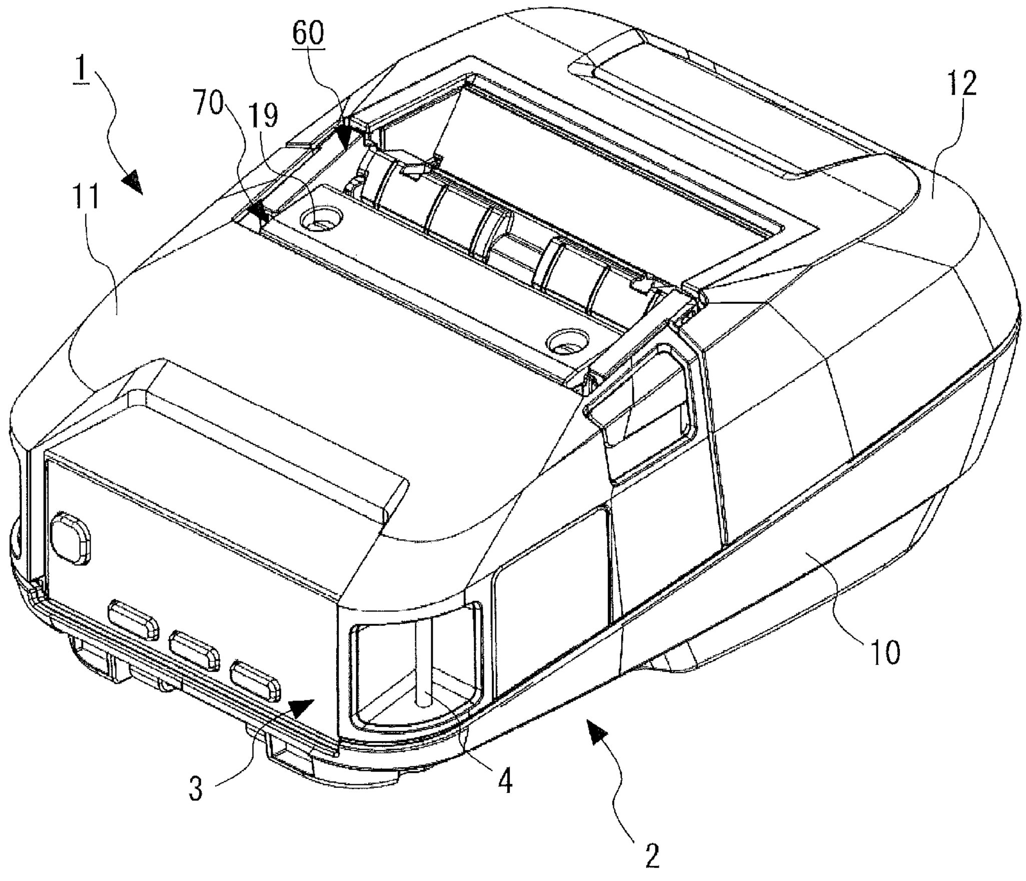
FIG. 15 is an appearance perspective view of the printing apparatus, showing an example where a peeler unit is installed to the printing apparatus.
Figure 16:
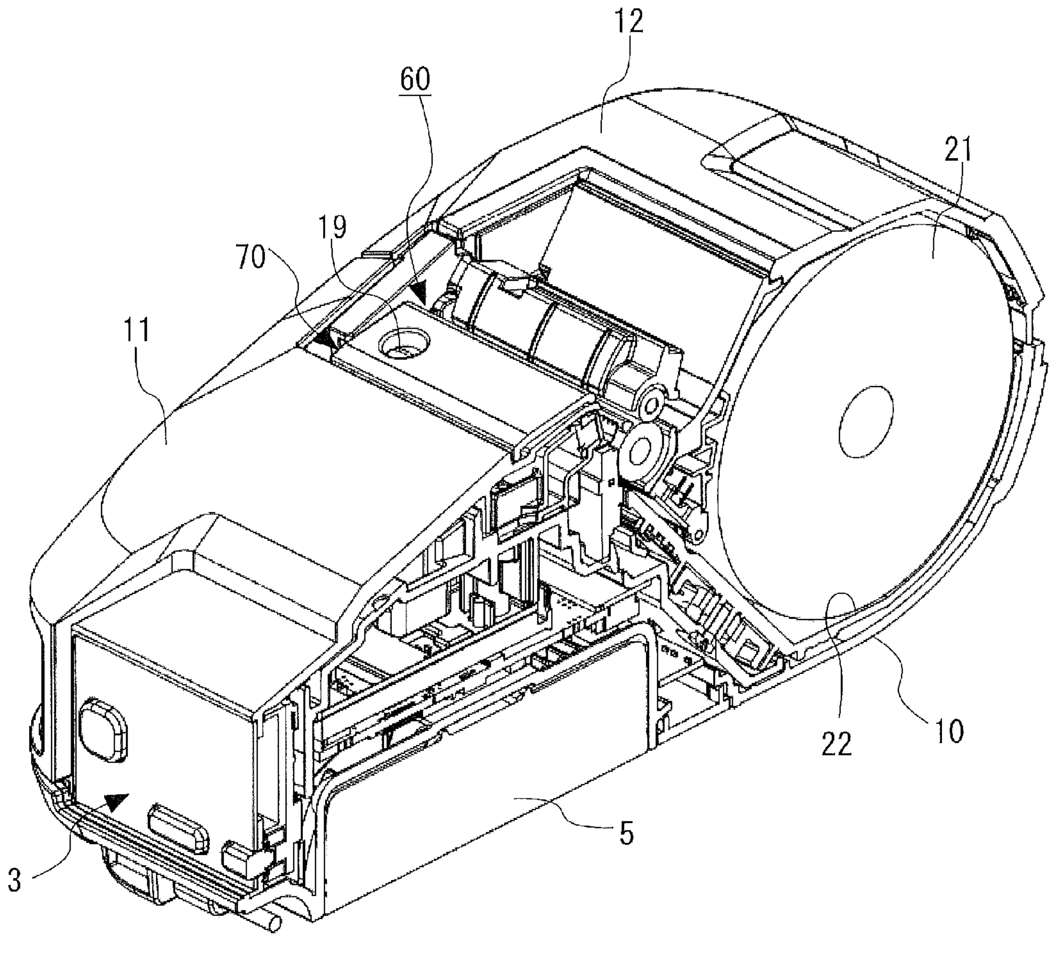
FIG. 16 is a central sectional perspective view of the printing apparatus, showing the example where the peeler unit is installed to the printing apparatus.

At this time, as shown in FIG. 14, the lid member 30 and the linerless unit 50 are formed to surround a part of the discharge port 15 through which the tape-shaped label L without a mount, as the printing medium pulled out from the roll 21 and printed, is discharged.

The detector 7 is configured to detect the label L that is discharged from the discharge port 15 while a discharge direction thereof is restrained by the awning-shaped restraint edge part 52, in the present illustrative embodiment, the label L pulled out from the roll 21 and printed.

Here, after preparing the label L by using desired print data, the user can pick up the label L discharged from the discharge port 15 and cut the same by using the front-side tear bar 14.

Also in this configuration, in a case where a unit configured to perform specific processing on the label L is not installed to the front-side installation part 20 to which the unit is removably installed, the lid member 30 is installed to the front-side installation part 20.

Thereby, the lid member 30 covers the front-side installation part 20 to configure a part of the appearance of the printing apparatus 1, so that the good-looking appearance of the printing apparatus 1 can be maintained.

Peeler Unit

FIGS. 15 to 30 show a case where a peeler unit 60 as a unit configured to perform specific processing on a printing medium is installed. Note that, in descriptions below, the same configurations as the above illustrative embodiment are denoted with the same reference signs, and the detailed descriptions thereof are omitted.

As shown in FIGS. 15 to 18B, the printing apparatus 1 configures the housing 2 by the lower case 10, the upper front-side cover 11 and the upper rear-side cover 12, has the operation panel unit 3 and the hook portions 4 provided on the surface, and is provided therein with the battery 5, the circuit board 6, the detector 7, the front-side tear bar 14, the print head 16, and the platen roller 17.

Instead of the lid member 30, an upper unit 70 of a peeler unit 60 is removably installed to the front-side installation part 20 of the upper front-side cover 11 via the pair of left and right screws 19.

The accommodation part 22 is provided below the upper rear-side cover 12. The accommodation part 22 is configured to replaceably accommodate the roll 21, on which a plurality of labels L discretely put on a mount P having a long shape is wound, as the printing medium. For example, the labels L are removably stuck on the mount P.

In addition, the rear end portion of the upper front-side cover 11 and the tip end portion of the upper rear-side cover 12 are spaced, and the spaced portion is provided with the discharge port 15 through which the label L after printing is discharged.

Figure 17A:
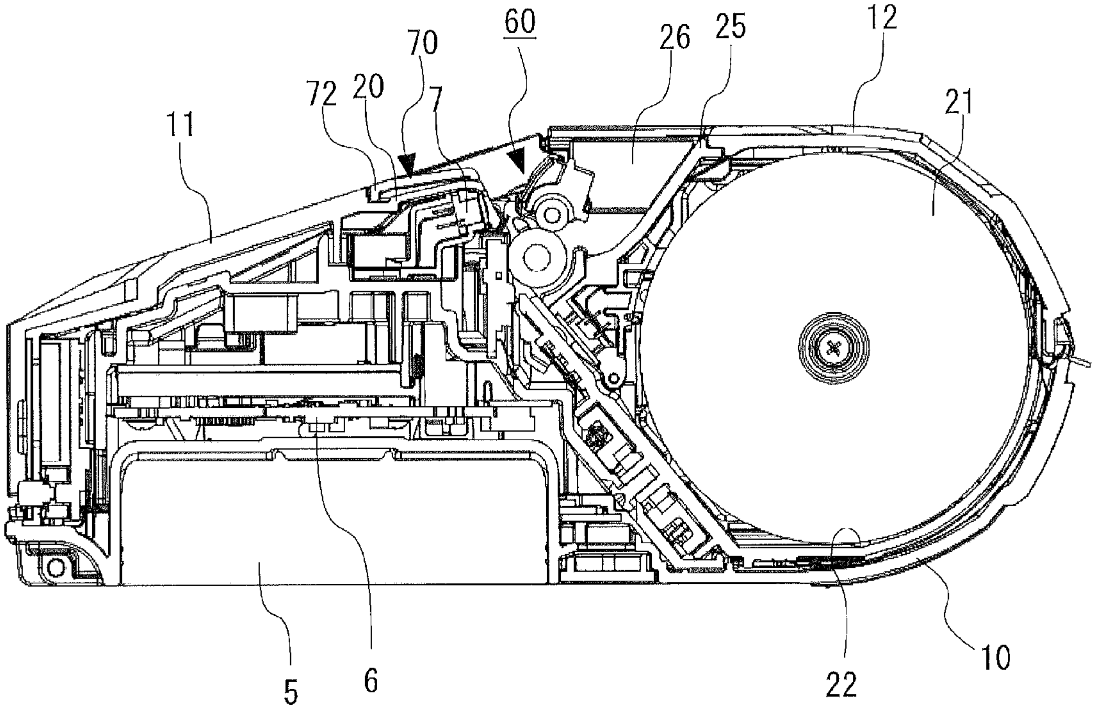
Figure 17B:
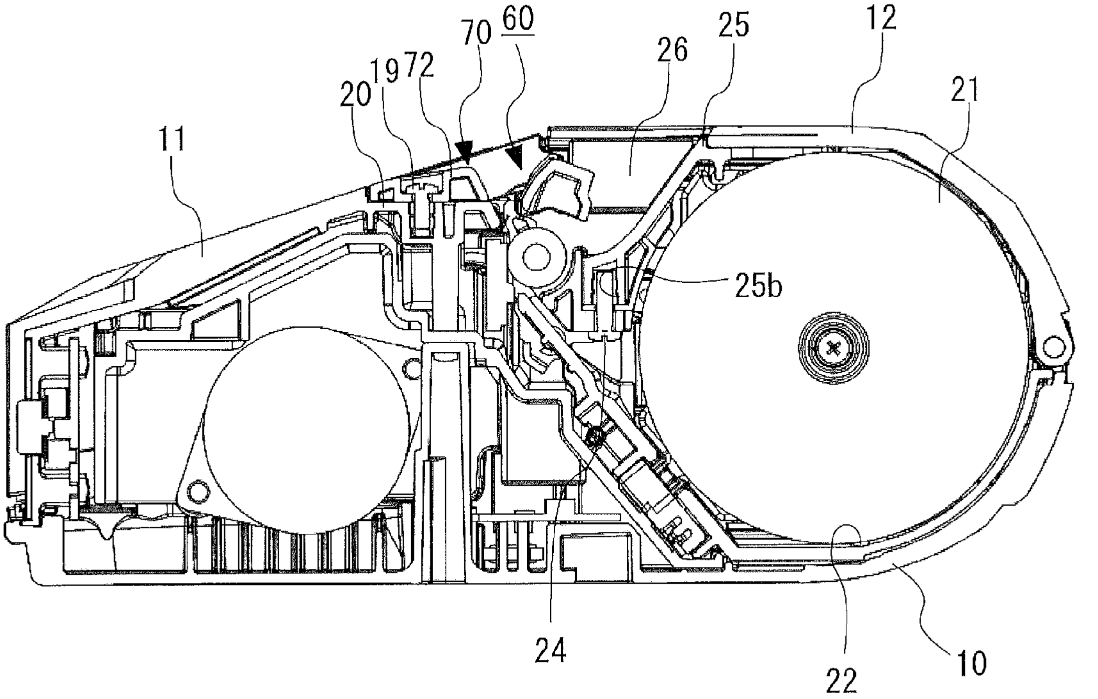
Figure 18A:
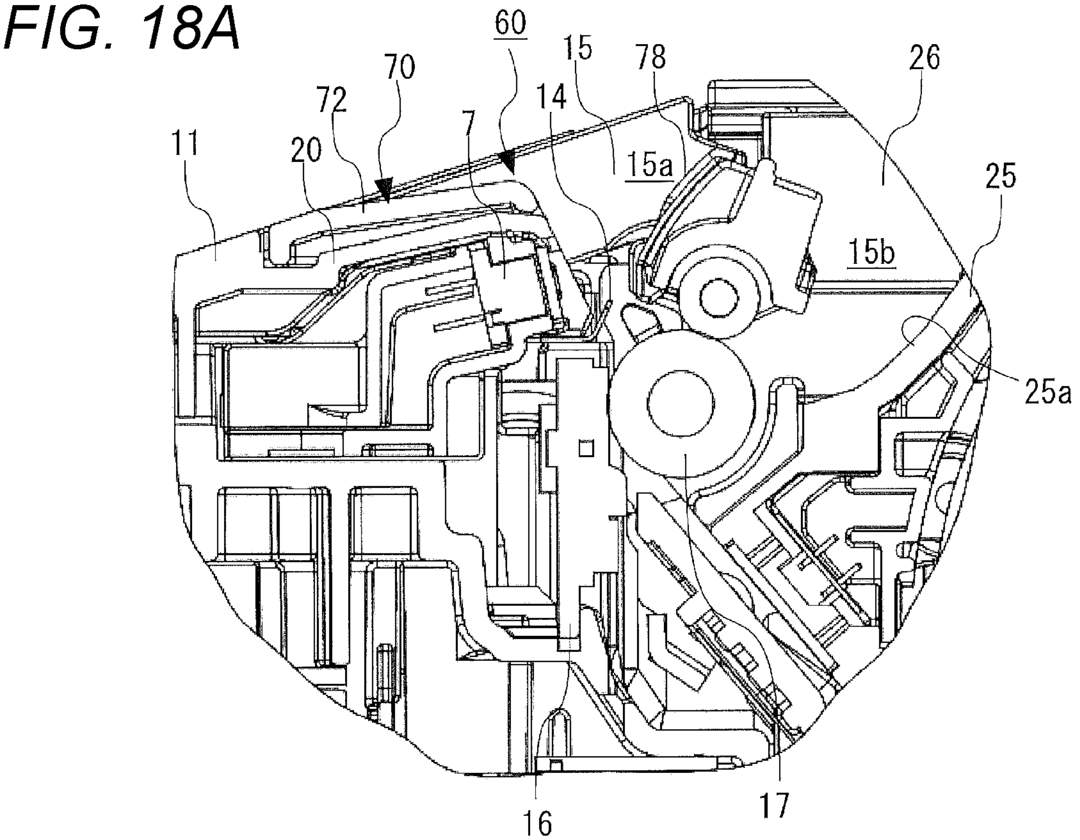
Figure 18B:
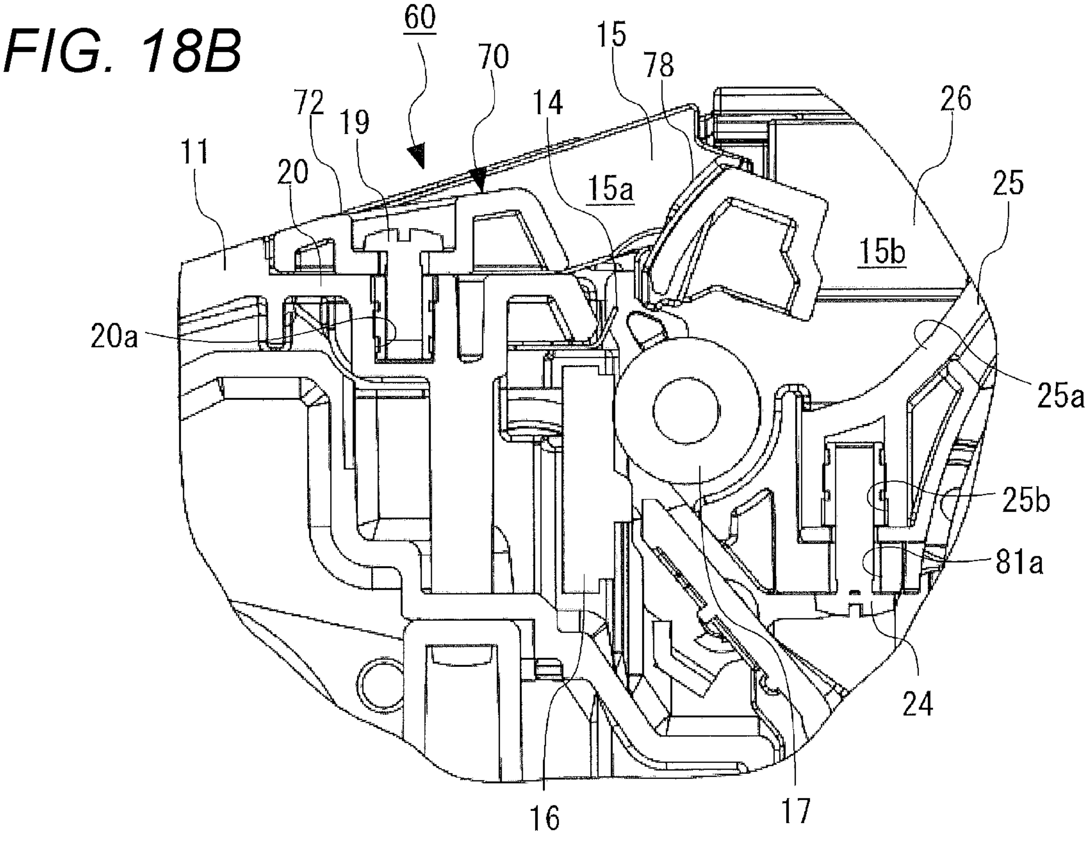
Figure 19:
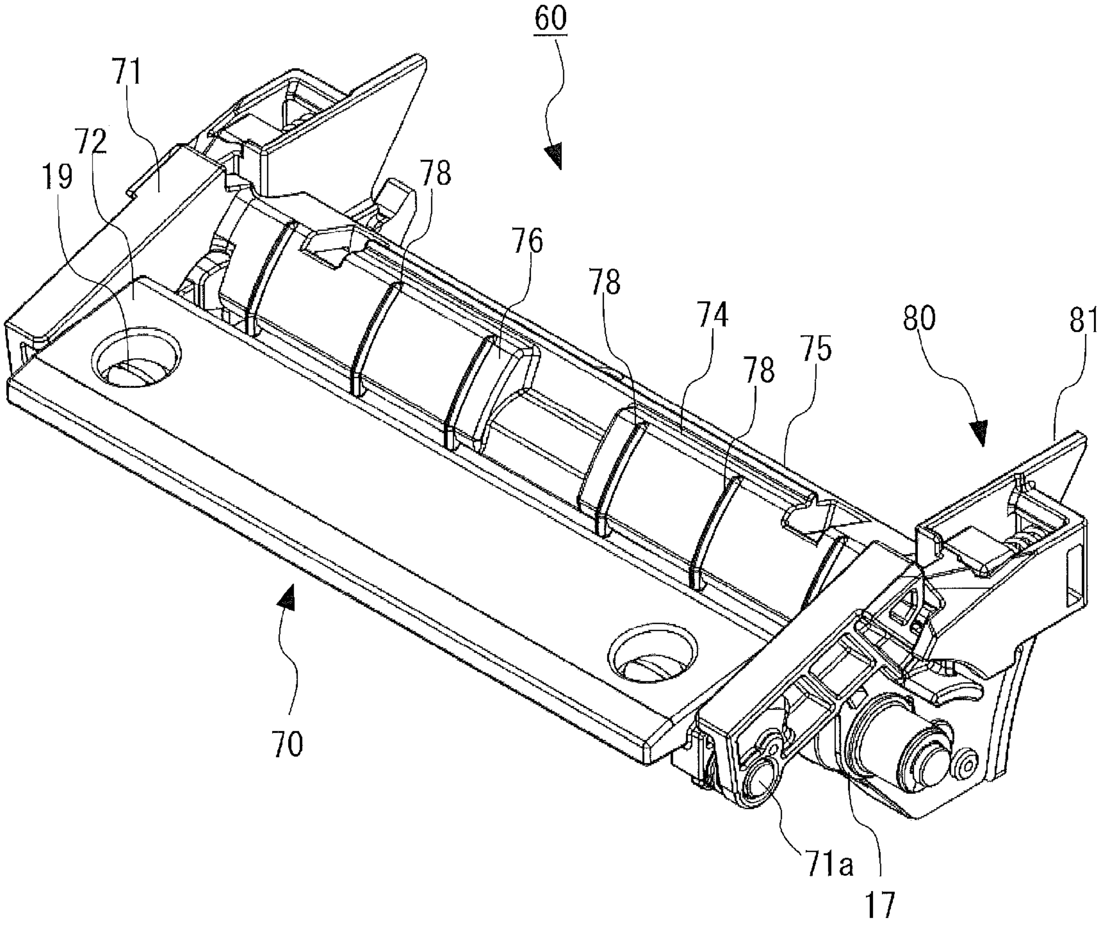
FIG. 19 is a perspective view of the peeler unit that is installed to the printing apparatus.
Figure 20:
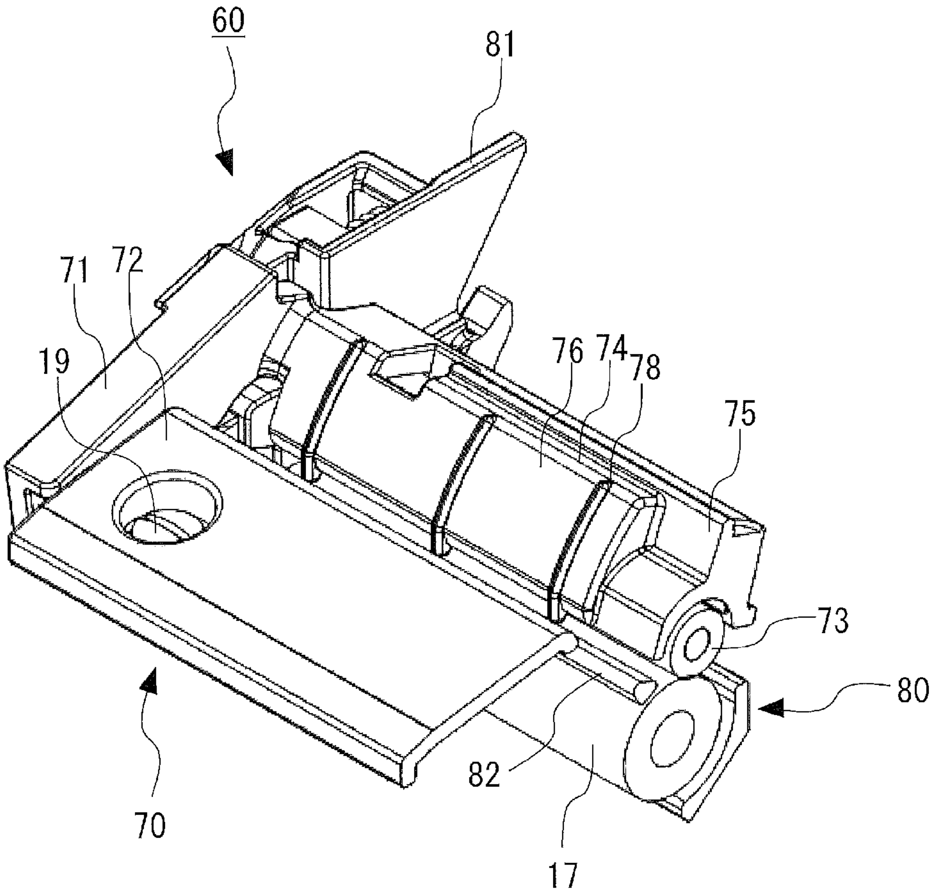
FIG. 20 is a central sectional perspective view of the peeler unit that is installed to the printing apparatus.
Figure 21A:
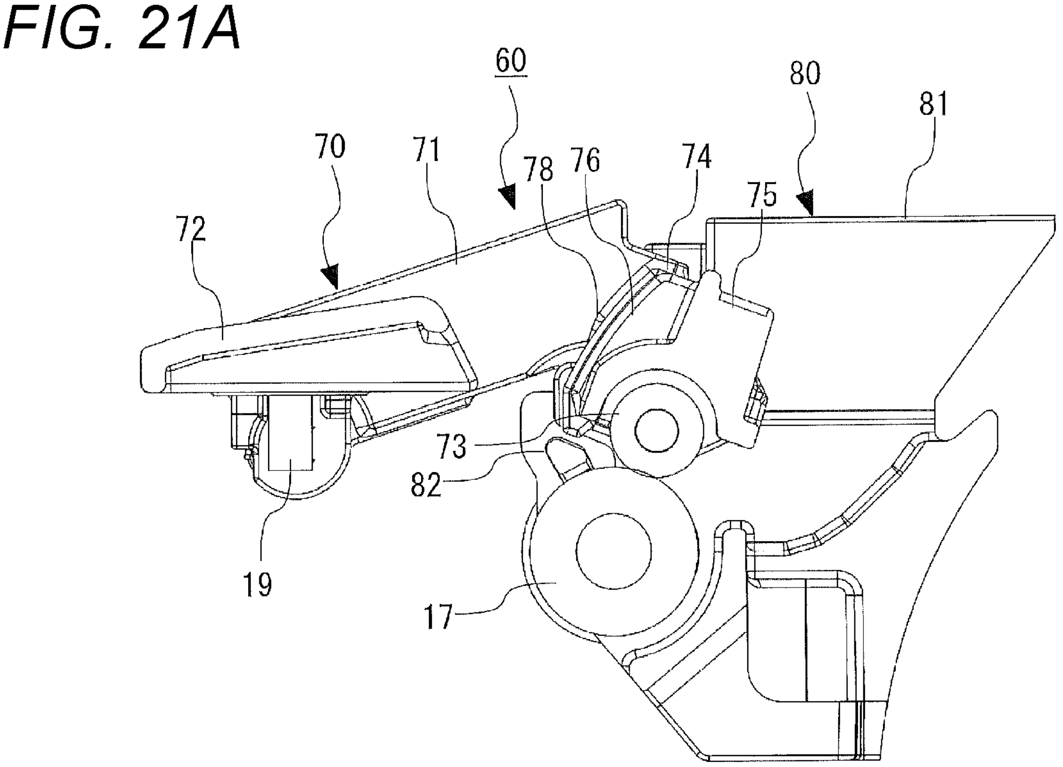
Figure 21B:
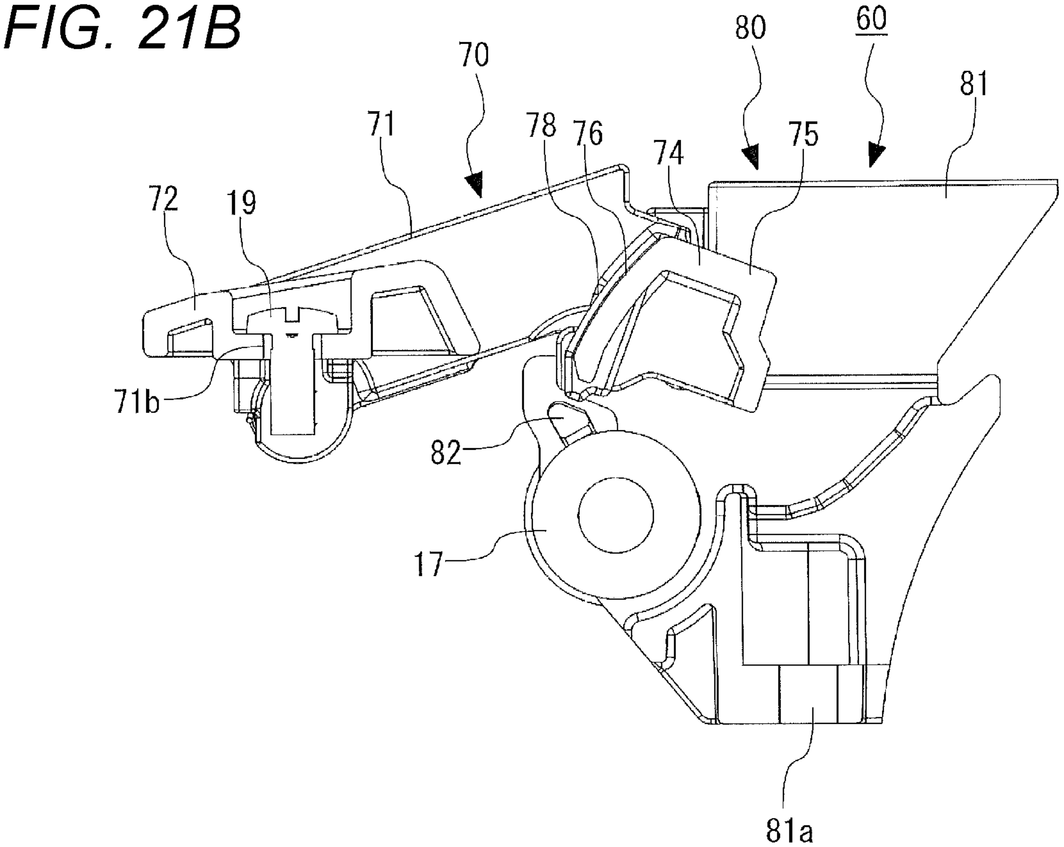
Figure 22:
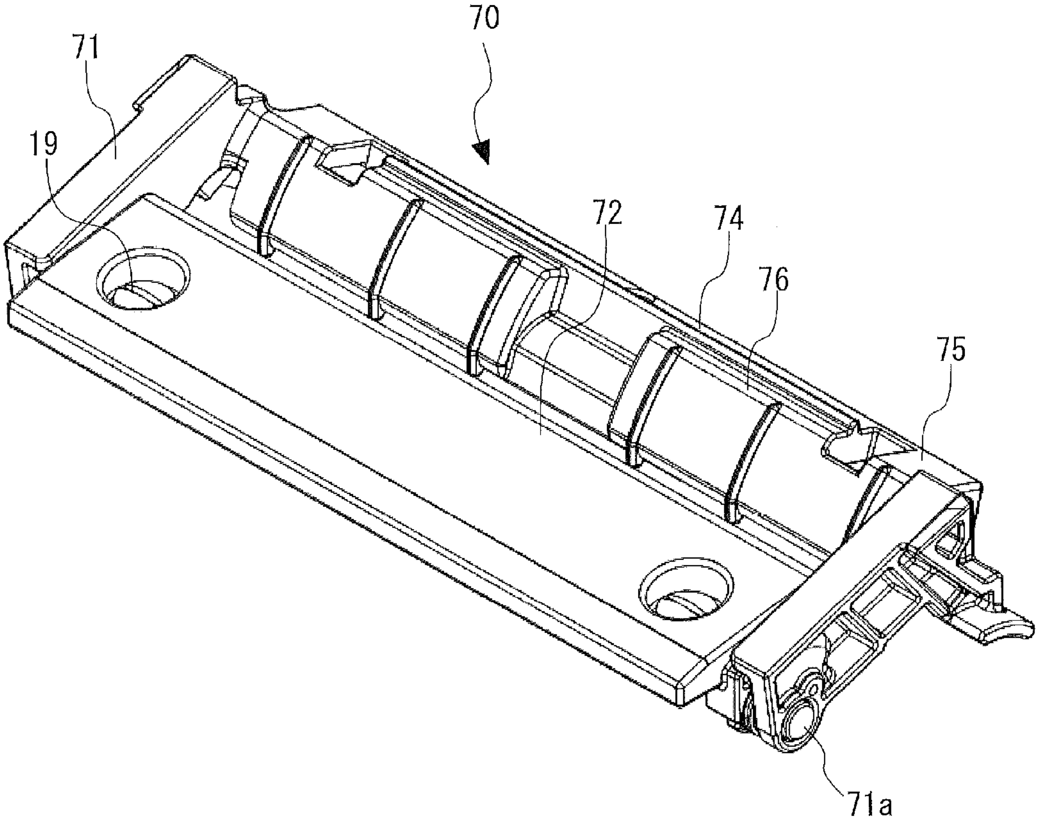
FIG. 22 is a perspective view of an upper unit that configures a part of the peeler unit.
Figure 23:
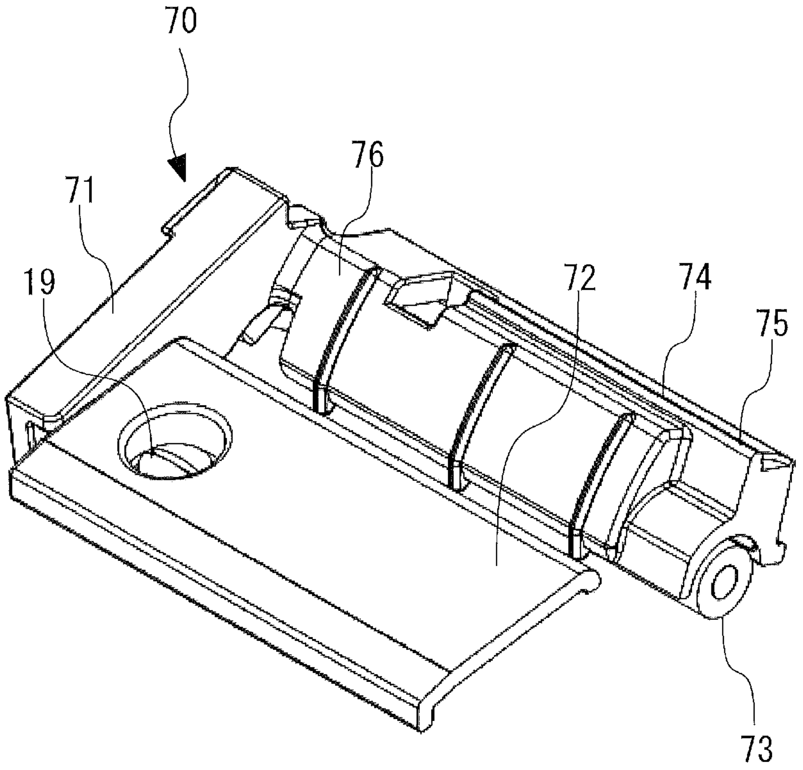
FIG. 23 is a central sectional perspective view of the upper unit that configures a part of the peeler unit.
Figure 24A:
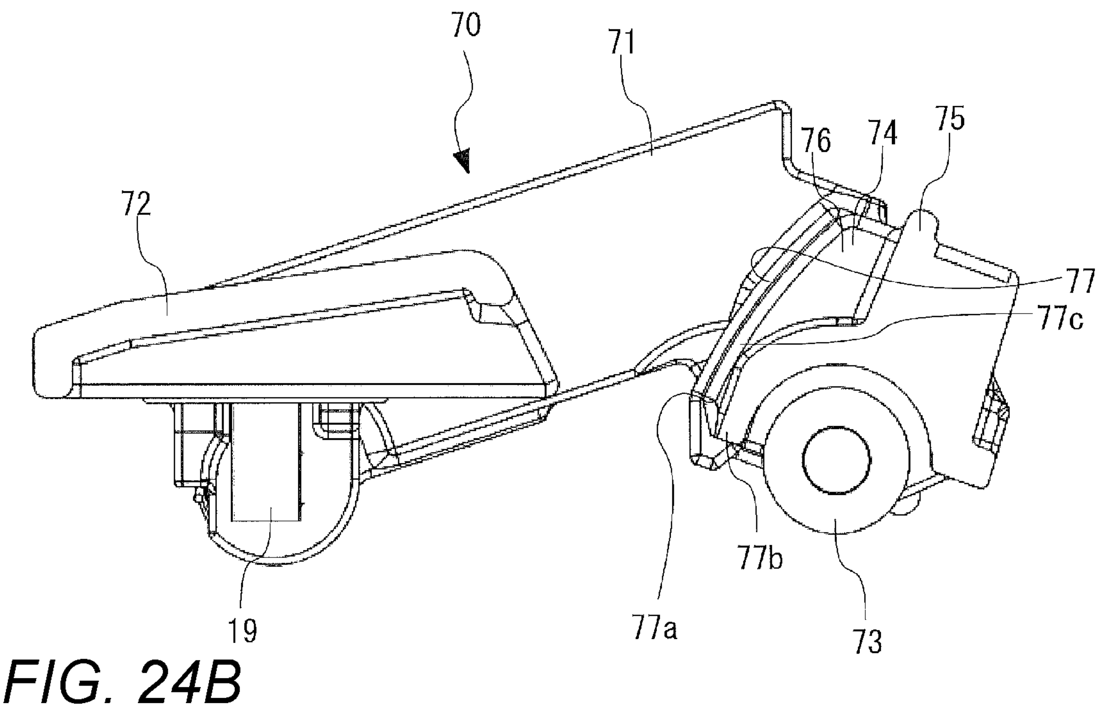
Figure 24B:
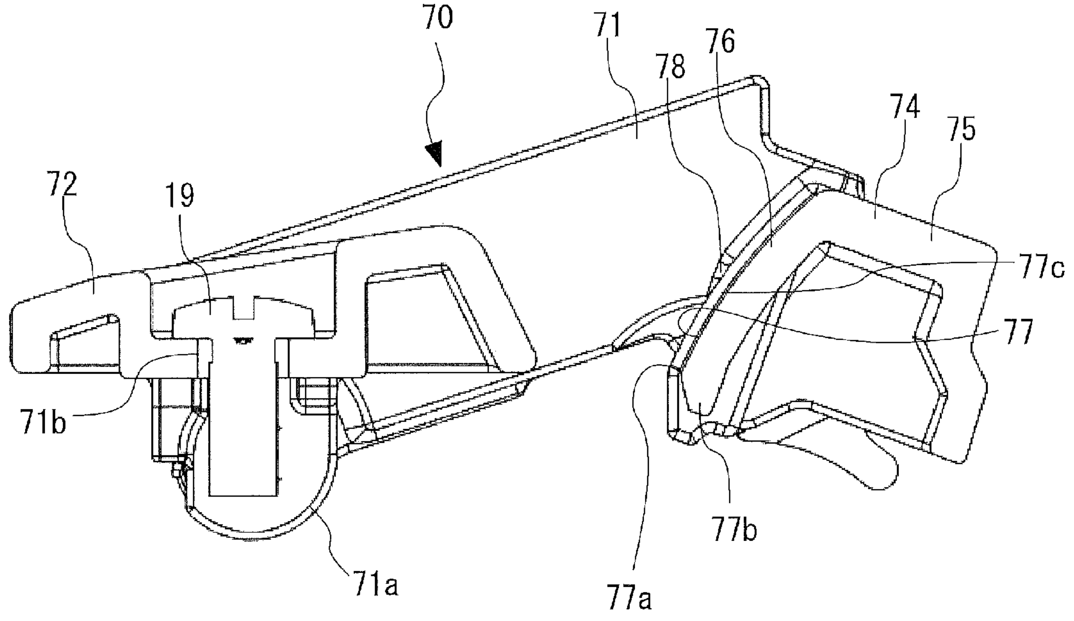

Note that, the upper rear-side cover 12 is provided with the rear-side installation part 25 to which a lower unit 80 of the peeler unit 60 is removably installed via the pair of left and right screws 24 (only one is shown in FIGS. 17B and 18B).

As shown in FIGS. 19 to 21B, the peeler unit 60 configured to peel off the label L (refer to FIG. 30) from the mount P (refer to FIG. 30) includes: the upper unit 70 that is attached to the front-side installation part 20 via the pair of left and right screws 19, instead of the lid member 30; and the lower unit 80 that is attached to the rear-side installation part 25 via the screws 24, instead of the double tear bar unit 40 or the lid member 50.

As shown in FIGS. 22 to 24B, the upper unit 70 includes a pair of left and right bracket parts 71, a stand part 72 disposed between tip end portions of the bracket parts 71, a discharge roller 73 bridged between rear end portions of the bracket parts 71, and a division wall part 74 configured to rotatably support both ends of the discharge roller 73.

The bracket parts 71 are swingably supported to the stand part 72 by shaft parts 71*a*.

The stand part 72 has an appearance shape that is substantially the same as the lid member 30 between the tip end portions of the bracket parts 71. The stand part 72 is formed with a pair of through-holes 71*b* (refer to FIG. 21B) through which the male thread portions of the screws 19 penetrate.

Figure 25:
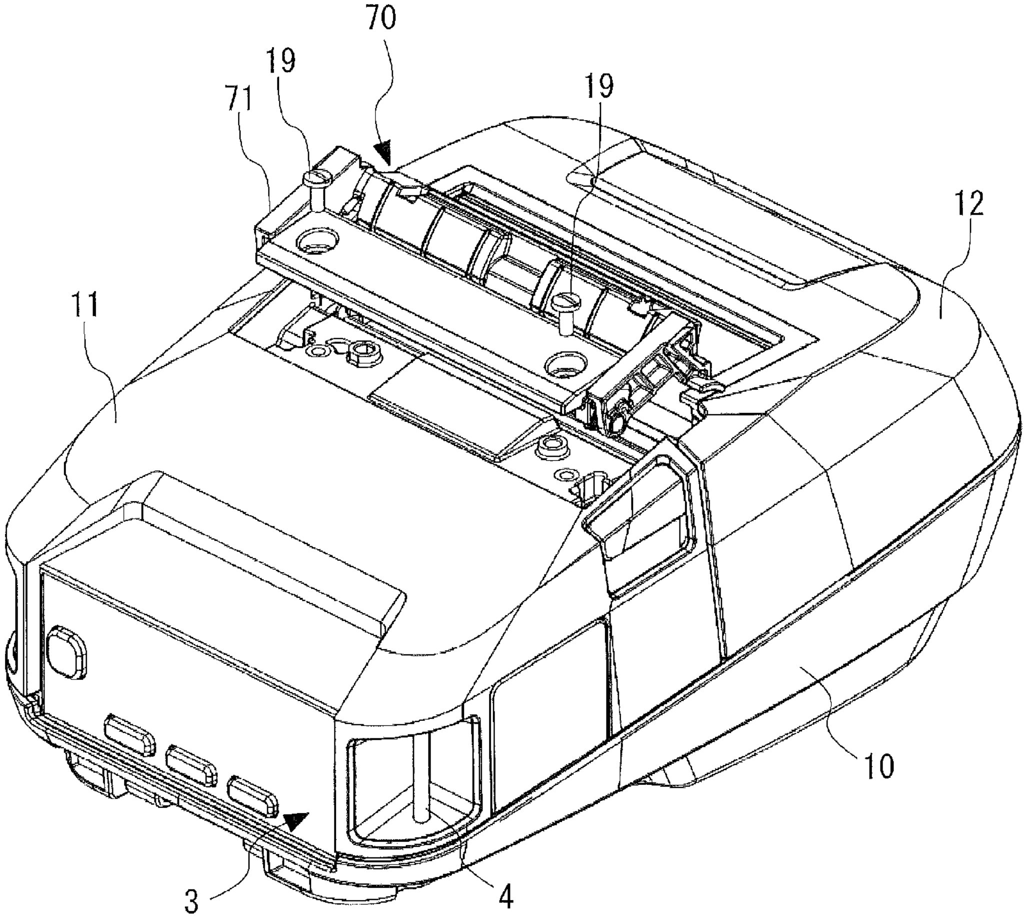
FIG. 25 is an exploded perspective view on the front side before the upper unit, which configures a part of the peeler unit, is installed to the printing apparatus.
Figure 26:
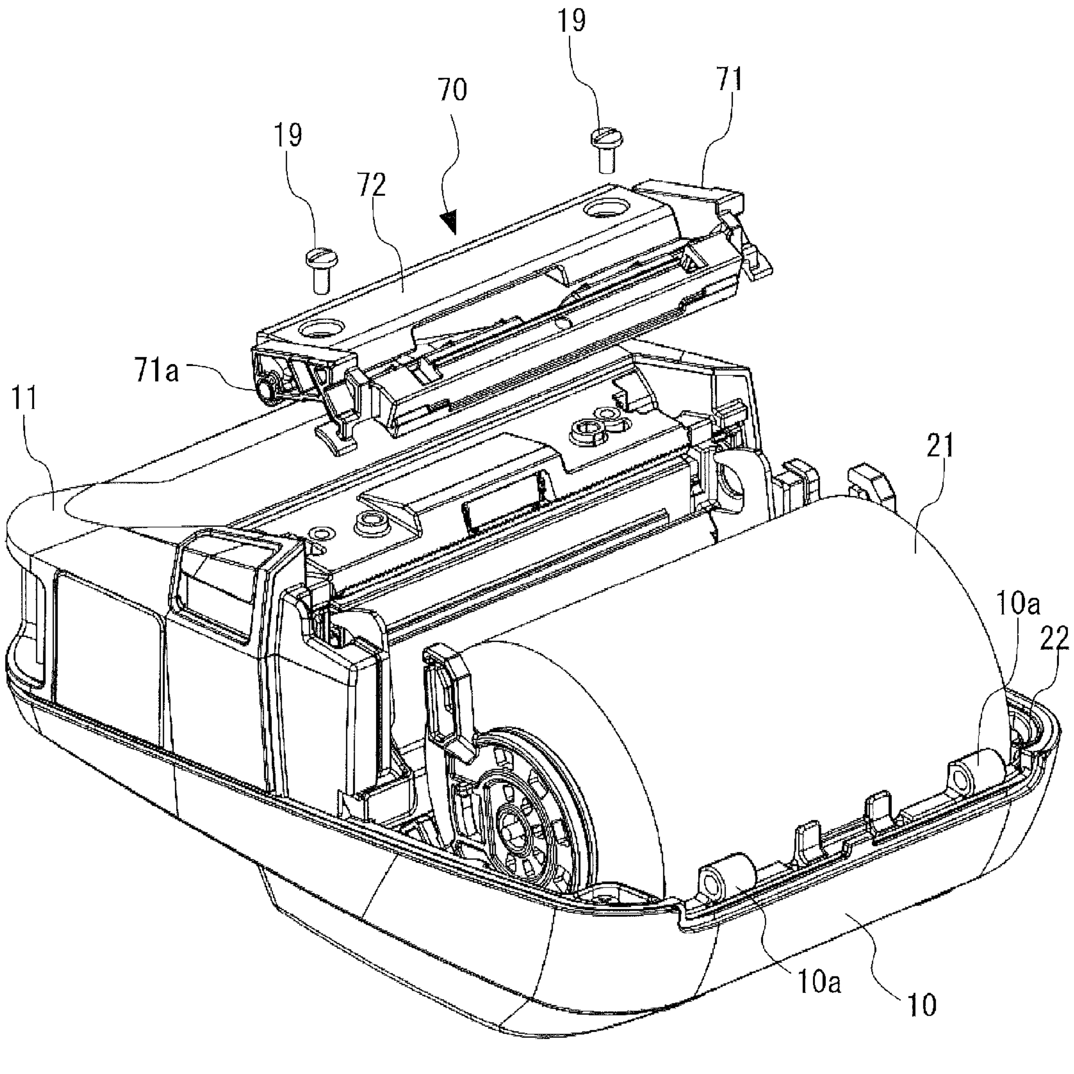
FIG. 26 is an exploded perspective view on the rear side before the upper unit, which configures a part of the peeler unit, is installed to the printing apparatus.
Figure 27:
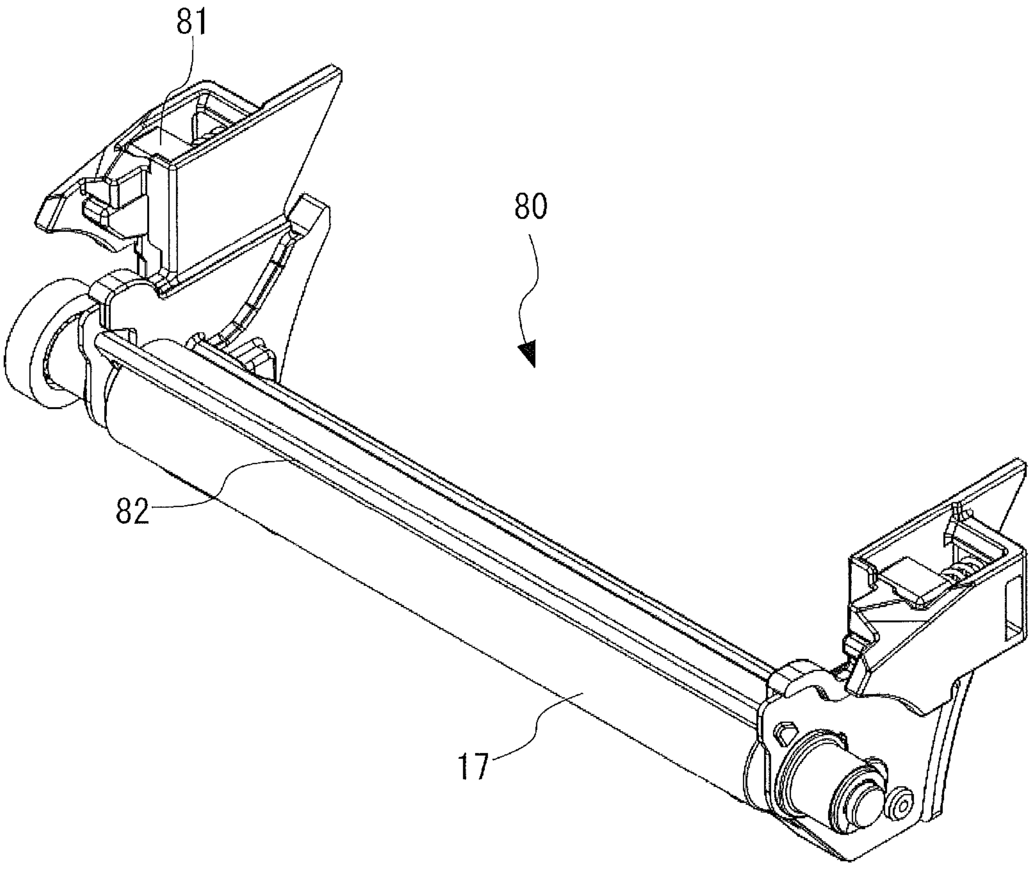
FIG. 27 is a perspective view of a lower unit that configures a part of the peeler unit.
Figure 28:
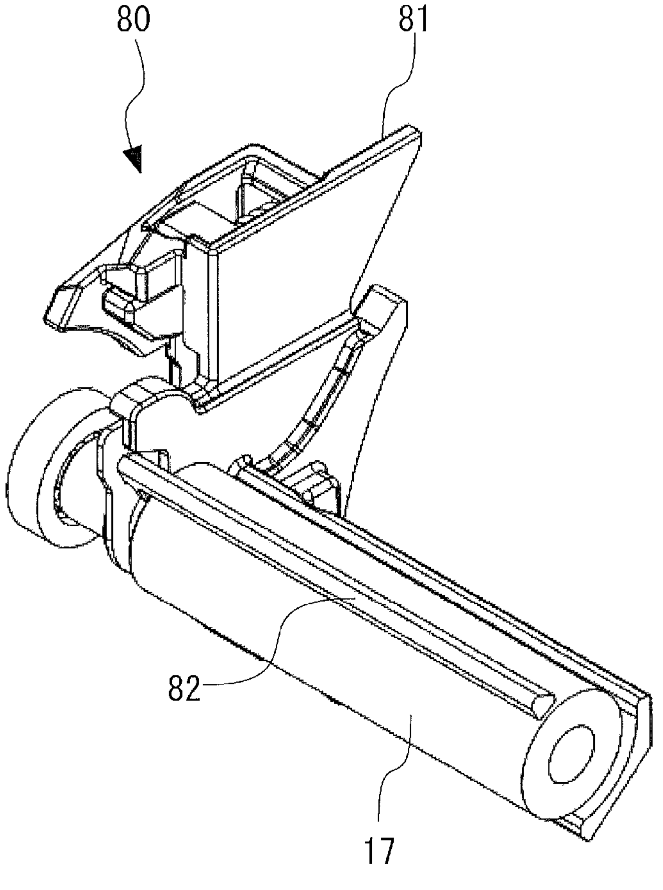
FIG. 28 is a central sectional perspective view of the lower unit that configures a part of the peeler unit.
Figure 29A:
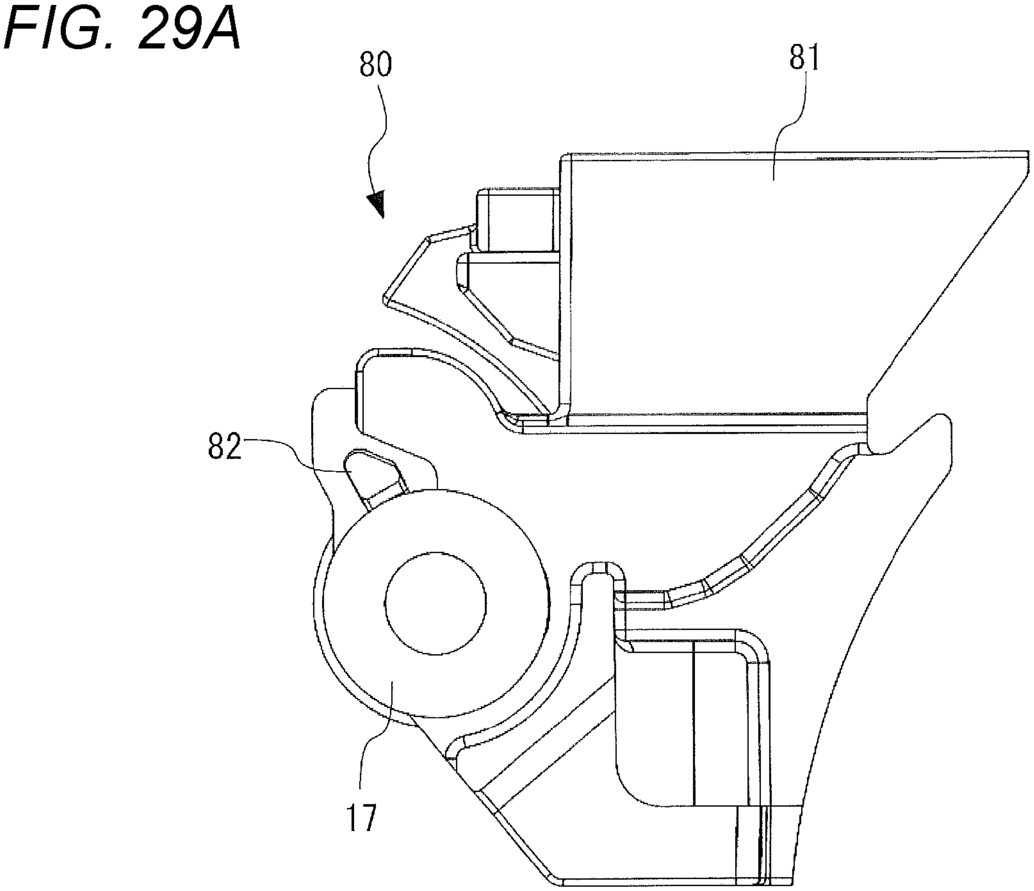
Figure 29B:
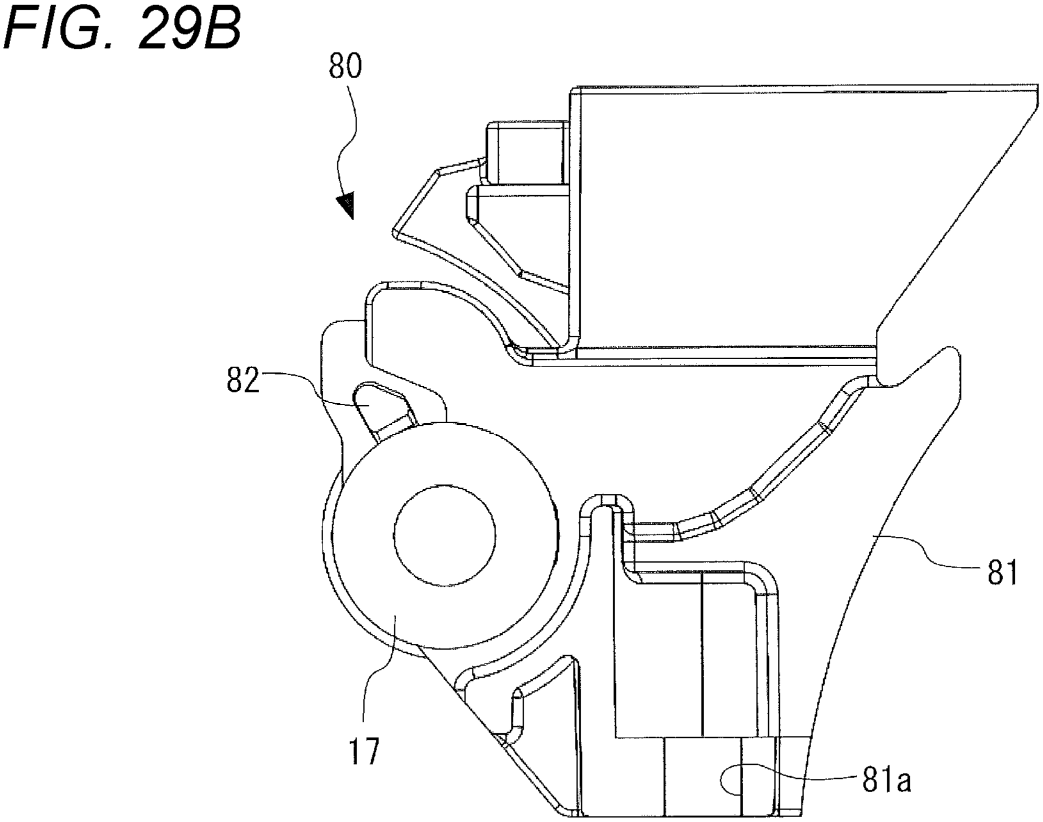

Thereby, as shown in FIGS. 25 and 26, the upper unit 70 is installed to the front-side installation part 20 of the upper front-side cover 11 by the screws 19. The screws 19 are screwed into the attachment holes 20*a* of the upper front-side cover 11.

The discharge roller 73 is a driven roller and is configured to come into contact with the platen roller 17 near an upper rear portion of the platen roller 17, thereby rotating in a driven manner to nip and convey the mount P.

The division wall part 74 has a support part 75 and a guide part 76. The support part 75 is configured to rotatably support the discharge roller 73 so as to cover the upper of the discharge roller 73. The guide part 76 is provided ahead of the support part 75 and is configured to divide the discharge port 15 into a front-side discharge part 15*a* and a rear-side discharge part 15*b*.

The guide part 76 integrally has a guide surface 77 having a ridge line portion 77*a* where a midway portion near the lower in the upper and lower direction is located in the foremost position, and a plurality of ribs 78 protruding forward from the guide surface 77 and provided spaced by predetermined intervals at a plurality of portions in the right and left.

The guide surface 77 has the ridge line portion 77*a* as a boundary, and a lower part thereof is formed as a mount guide part 77*b* bent downward and an upper part is formed as a label guide part 77*c* bent and inclined in a front-low and rear-high shape.

As shown in FIGS. 27 to 29B, the lower unit 80 has: a pair of left and right bracket parts 81 having through-holes 81*a* and installed to the upper rear-side cover 12 via the screws 24 (refer to FIGS. 17B and 18B); a peeler part 82 configured to bend the mount P and to separate the mount P from the label L; and the platen roller 17 disposed below the peeler part 82 and pivotally supported by the bracket parts 81.

The peeler part 82 has an R-shaped section on a tip end-side, and is configured to bend the mount P. The bent mount P is nipped and conveyed by the platen roller 17 and the discharge roller 73. Since the label L stuck on the mount P is not bent due to its rigidity even when the mount P is bent, the label is peeled off from the mount P. In this way, the lower unit 80 is configured to gradually peel off the label L after printing from the mount P by conveying the bent mount P.

Here, for example, the double tear bar unit 40 as the first unit and the linerless unit 50 or the peeler unit 60 as the second unit different from the double tear bar unit 40 can be selectively installed to the upper rear-side cover 12 supported on the lower case 10 as the main body and functioning as the opening/closing cover configured to swing between a closed position in which the accommodation part 22 is covered and an opened position in which the accommodation part 22 is opened. In addition, the cover guide 25*a* configured to guide the label L that is conveyed by the platen roller 17 in a case where the linerless unit 50 is installed to the upper rear-side cover 12 or the mount P that is conveyed by the platen roller 17 in a case where the peeler unit 60 is installed, and the discharge port 15 for discharging the label L or the mount P guided by the cover guide 25*a* toward one side (upward) in the first direction (upper and lower direction) are provided. In a case of being installed to the rear-side installation part 25 of the upper rear-side cover 12, the double tear bar unit 40 is provided with the partition wall 42 provided superposed to cover the cover guide 25*a* and inclined in a front-low and rear-high shape so as to partition the platen roller 17 and the discharge port 15.

Specifically, for example, the double tear bar unit 40 or the peeler unit 60 is selectively installed to the upper rear-side cover 12 that is configured to open and close the accommodation part 22 in which the roll 21 where the plurality of labels L is discretely stuck on the mount P having a long shape is accommodated.

The label L on the mount P pulled out from the accommodation part 22 is subjected to predetermined processing by the double tear bar unit 40 or the peeler unit 60 and is then discharged to an outside of the printing apparatus 1 from the discharge port 15.

In a case where the double tear bar unit 40 is installed, the mount P is conveyed by the platen roller 17 provided to the double tear bar unit 40. In a case where the peeler unit 60 is installed, the mount P is conveyed by the platen roller 17 and the discharge roller 73 provided to the peeler unit 60.

In a case where processing different from each other is performed by the double tear bar unit 40 and the peeler unit 60, the suitable conveyance path at the time of discharging the label from the discharge port 15 after the processing may be different due to difference in processing content, difference in printing medium that is a processing target, and the like.

Therefore, in order to provide the suitable conveyance path corresponding to each processing, the upper rear-side cover 12 is provided with the cover guide 25*a*. The cover guide 25*a* is configured to guide the mount P that is guided by the platen roller 17 and the discharge roller 73, in a case where the peeler unit 60 is installed to the upper rear-side cover 12. The cover guide 25*a* can guide the mount P after the label L is peeled off, in an aspect suitable for processing by the peeler unit 60, the type of the mount P to be subjected to the processing, and the like, for example.

In addition, the double tear bar unit 40 is provided with the partition wall 42. The partition wall 42 is provided superposed to cover the cover guide 25*a* in a state where the double tear bar unit 40 is installed to the upper rear-side cover 12. The partition wall 42 is configured to partition the platen roller 17 and the discharge port 15. In a case where the double tear bar unit 40 is installed to the upper rear-side cover 12, the mount P (or label L) that is conveyed by the platen roller 17 is conveyed along the conveyance path defined by the partition wall 42, not the guide part 25*a*.

The partition wall 42 can define the conveyance path for guiding the printing medium toward the discharge port 15 in an aspect suitable for processing by the double tear bar unit 40, the type of the mount P (or the label L without a mount) to be subjected to the processing, and the like, for example.

In this way, the suitable conveyance path can be configured, according to each of the case where the double tear bar unit 40 is installed to the upper rear-side cover 12 and the case where the peeler unit 60 is installed to the upper rear-side cover 12.

The cover guide 25*a* is inclined in a front-low and rear-high shape so as to be further upward in the upper and lower direction toward the rear from a near position on the rear side in the front and rear direction, which is a position near the platen roller 17 and the discharge roller 73 provided to the peeler unit 60 installed to the upper rear-side cover 12.

In this way, the cover guide 25*a* is inclined from the discharge port 15 in the front-low and rear-high shape, so that when the peeler unit 60 is installed to the upper rear-side cover 12, the printing medium (for example, the mount P) can be guided in an aspect suitable for processing by the peeler unit 60, the type of the printing medium to be subjected to the processing, and the like.

In addition, the partition wall 42 is inclined in a front-low and rear-high shape so as to be further upward in the upper and lower direction toward the rear from a near position on the front side in the front and rear direction, which is a position near the platen roller 17 provided to the double tear bar unit 40 installed to the upper rear-side cover 12, and an inclination angle is smaller than an inclination angle of the cover guide 25*a*.

In this way, the inclination angle of the partition wall 42 inclined in the front-low and rear-high shape is smaller than (gentler) than the inclination angle of the cover guide 25*a*. Therefore, in a case where the double bar tear unit 40 is installed to the upper rear-side cover 12, the printing medium can be guided in an aspect suitable for the processing by the double tear bar unit 40, the type of the printing medium to be subjected to the processing, and the like.

The double tear bar unit 40 has the rear-side tear bar 43 separately from the front-side tear bar 14, as a cutting blade for manually cutting the printing medium, with the discharge port 15 being interposed therebetween. Therefore, in a case where the double tear bar unit 40 is installed, the user can manually cut the discharged printing medium by selectively using the front-side tear bar 14 or the rear-side tear bar 43.

Note that, in a case where the peeler unit 60 is installed as the second unit, the printing medium where the plurality of labels L is discretely stuck on the mount P having a long shape is used, the label L can be peeled off from the mount P and the mount P and the label L can be discharged in a separated state through the discharge port 15.

On the other hand, in a case where the linerless unit 50 is installed as the second unit, a material that suppresses sticking of the adhesive layer of the printing medium is used for the platen roller 17 and the surface of the restraint edge part 52 has been subjected to the surface treatment of suppressing sticking of the adhesive layer of the printing medium. Therefore, it is possible to convey the printing medium to the discharge port 15 while suppressing the adhesive layer of the printing medium being conveyed from being stuck to the platen roller 17 and the restraint edge part 52.

In this way, the front-side installation part 20 and the rear-side installation part 25 configure a installation part configured to enable replacement of the lid member 30 or (the upper unit 70 of) the peeler unit 60 and the double tear bar unit 40, the linerless unit 50 or (the lower unit 80 of) the peeler unit 60, according to use aspects thereof (aspects to issue labels).

Specifically, the front-side installation part 20 and the rear-side installation part 25 respectively have the attachment holes 20*a* and the attachment holes 25*b*, and can selectively attach combinations of the lid member 30 or the double tear bar unit 40, the lid member 30 and the linerless unit 50, and the upper unit 70 and the lower unit 80 of the peeler unit 60 via the screws 19 and the screws 24 respectively screwed into the attachment holes 20*a* and the attachment holes 25*b*.

Therefore, any one of (the upper unit 70 of) the peeler unit 60 and the lid member 30 is selectively attached to the front-side installation part 20 as an installation part. The attaching is performed by the screws 19 screwed into the attachment holes 20*a*. Similarly, any one of the double tear bar unit 40, the linerless unit 50 and (the lower unit 80 of) the peeler unit 60 is selectively attached to the rear-side installation part 25 as an installation part. The attaching is performed by the screws 24 screwed into the attachment holes 25*b*. Thereby, the user can easily attach and detach the peeler unit 60 or the lid member 30, and the double tear bar unit 40, the linerless unit 50 and the peeler unit 60 by a simple screwing operation.

Figure 30:
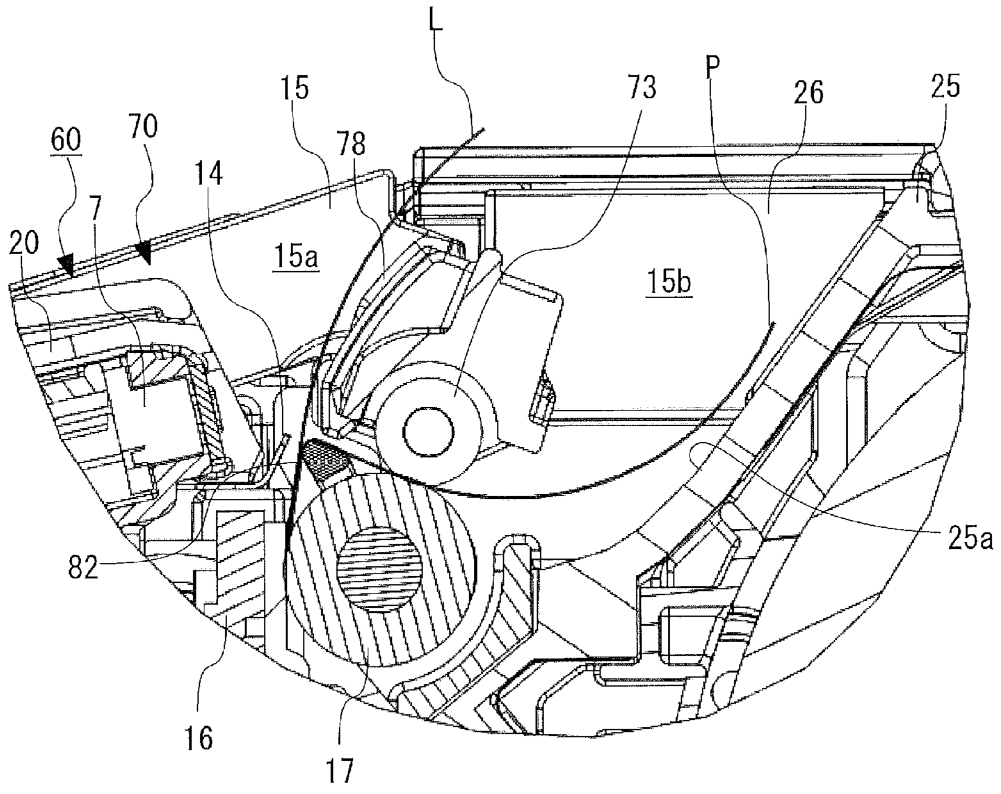
FIG. 30 is a sectional view illustrating operations of main parts, showing the example where the peeler unit is installed to the printing apparatus.

At this time, as shown in FIG. 30, the peeler unit 60 is formed to surround a part of the discharge port 15 through which the label L peeled off from the mount P, as the printing medium pulled out from the roll 21 where the plurality of labels L is discretely stuck on the mount P having a long shape and printed, is discharged.

The detector 7 is fixed to a bottom surface of the front-side installation part 20, and is configured to detect presence or absence of the label L, which is discharged from the discharge port 15 while being peeled off from the mount P via the peeler unit 60 installed to the rear-side installation part 25, in a contactless manner. In this way, the detector 7 is provided to the front-side installation part 20, not the peeler unit 60, so that it is possible to avoid troublesomeness to attach and detach the harness with respect to the detector 7 each time the peeler unit 60 is attached and detached.

Then, after preparing the label L by using desired print data, the user can stick the label L discharged from the discharge port 15 onto a desired object.

In the above, the illustrative embodiment of the present disclosure has been described in detail with reference to the accompanying drawings. However, the scope of the present invention is not limited to the above illustrative embodiment. It is obvious to one skilled in the art that a variety of changes, modifications, combinations and the like can be made within the technical scope of the present disclosure. Therefore, the technology of the changes, modifications, combinations and the like is also included within the technical scope of the present invention.

Also, other than mentioned above, the above illustrative embodiment and methods of each of the modified illustrative embodiments may be combined for use as appropriate.

Although not specifically exemplified, the present invention is put into practice with various changes made within a range not departing from the scope of the present invention.

What is claimed is:

1. A printing apparatus comprising:
- a main body having an accommodation part configured to accommodate a printing medium;
- an opening/closing cover supported by the main body so as to be swingable between a closed position and an opened position, the opening/closing cover covering the accommodation part in a case the opening/closing cover is in the closed position, the opening/closing cover opening the accommodation part in a case the opening/closing cover is in the opened position, the opening/closing cover including:
  - a guide wall being a part of the opening/closing cover, the guide wall having a first surface and a second surface, the first surface and the second surface being opposite,
    - the first surface being configured to guide the printing medium to be discharged from the printing apparatus,
    - the second surface facing an inside of the printing apparatus in the case the opening/closing cover is in the closed position, and
    - the second surface having an installation part,
    - the installation part being configured to respectively receive both, at respective times, one of a first unit and a second unit that are selectively installable, the second unit being different from the first unit,
  - the first unit including:
    - a first unit platen roller configured to discharge the printing medium from the printing apparatus; and
    - a partition wall configured to guide the printing medium to be discharged by the first unit platen roller,
  - the second unit including:
    - a second unit platen roller configured to discharge the printing medium from the printing apparatus; and
- a print head configured such that:
  - in a case the installation part of the second surface of the guide wall receives the first unit,
    - in the case the opening/closing cover is in the opened position, the print head is configured to be disposed at a position not to face the first unit platen roller,
    - in the case the opening/closing cover is in the closed position, the print head is configured to be disposed at a position facing the first unit platen roller of the first unit, and the print head is configured to perform printing on the printing medium while nipping the printing medium together with the first unit platen roller; and in a case the installation part of the second surface of the guide wall receives the second unit, in the case the opening/closing cover is in the opened position, the print head is configured to be disposed at a position not to face the second unit platen roller, in the case the opening/closing cover is in the closed position, the print head is configured to be disposed at a position facing the second unit platen roller, and the print head is configured to perform the printing on the printing medium while nipping the printing medium together with the second unit platen roller, wherein the installation part is further configured such that:

in a case the installation part of the second surface of the guide wall receives the first unit, the first surface of the guide wall is covered by the partition wall of the first unit, and in the case the opening/closing cover is in the opened position, the partition wall is configured to guide the printed printing medium to be discharged from the printing apparatus; and in a case the installation part of the second surface of the guide wall receives the second unit, a part of the first surface of the guide wall is uncovered by the second unit, and in the case the opening/closing cover is in the closed position, the uncovered part of the first surface of the guide wall is configured to guide the printed printing medium to be discharged from the printing apparatus.

2. The printing apparatus according to claim 1, wherein the installation part of the second surface of the guide wall has an installation hole having a bottomed female thread hole shape, wherein the bottomed female thread hole opens to the second surface of the guide wall and does not penetrate through the first surface of the guide wall, and wherein the installation part is configured to receive one of the first unit and the second unit that are selectively installable via a screw screwed in the installation hole.

3. The printing apparatus according to claim 1, wherein the first surface of the guide wall has an inclination angle larger than an inclination angle of the partition wall.

4. The printing apparatus according to claim 1, further including:

a circuit board disposed in the main body; and a cover member covering the circuit board, wherein the printing apparatus has a clearance between the cover member and the opening/closing cover, through which the printing medium is discharged outside the printing apparatus.

* * * * *